Figure 4:
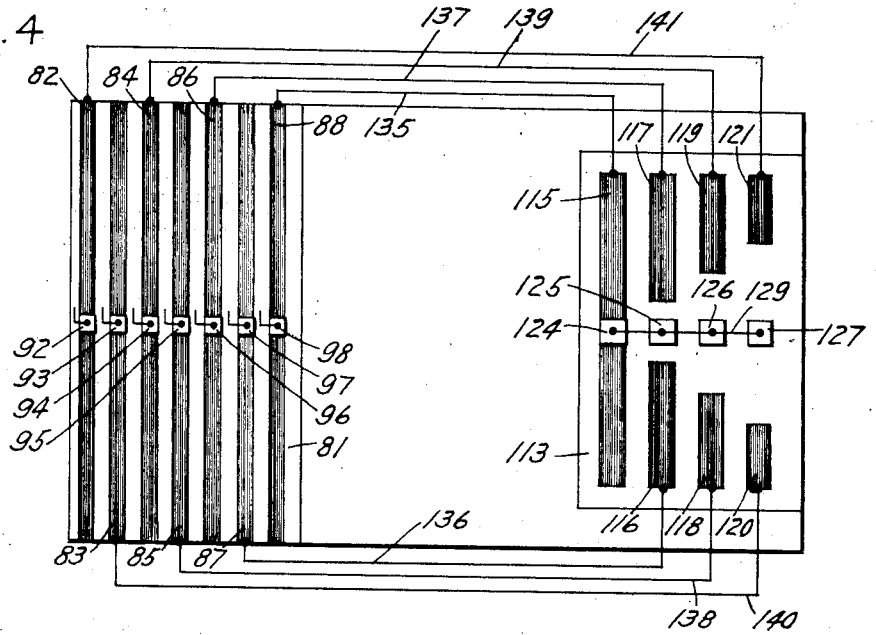

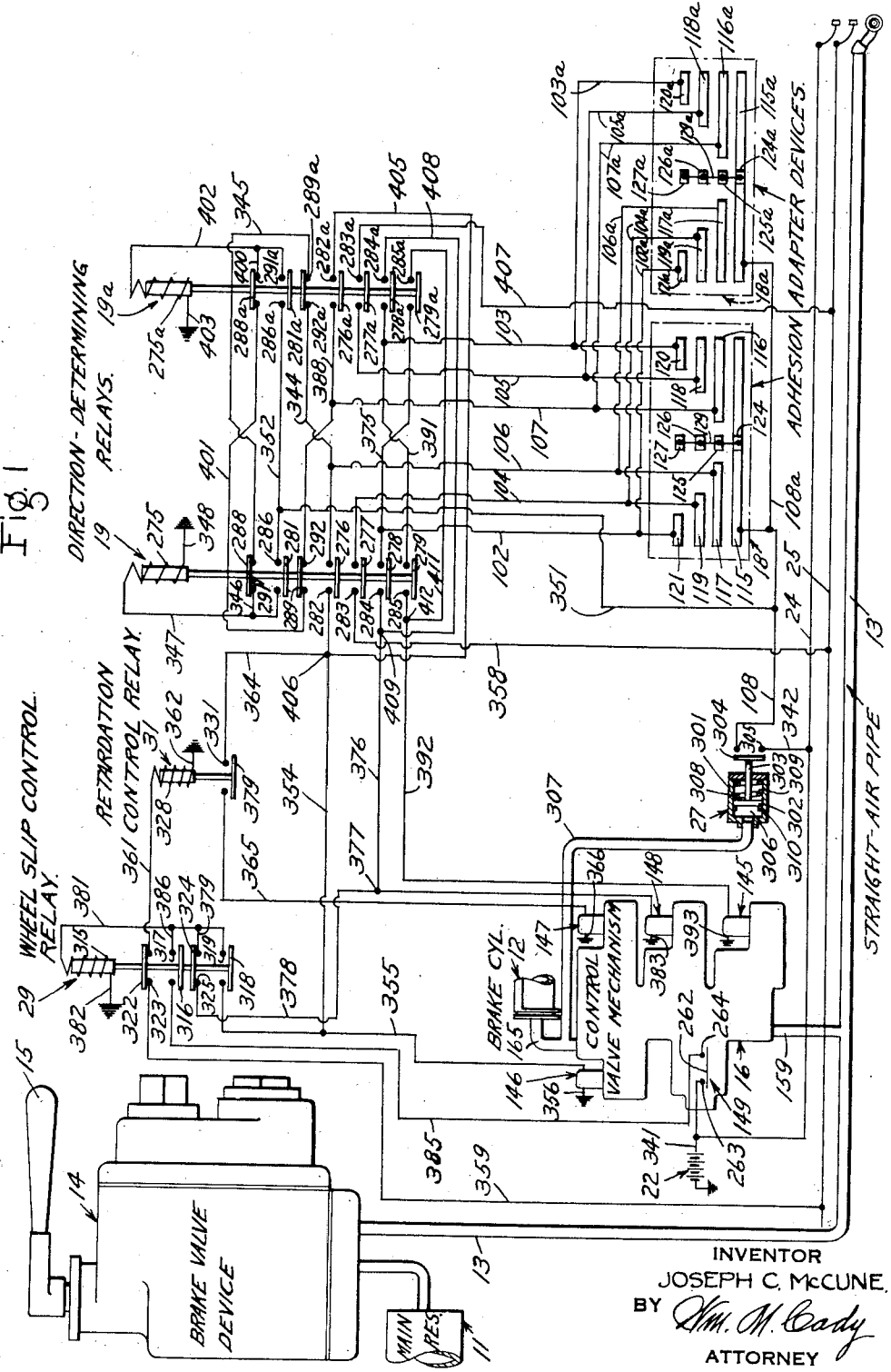

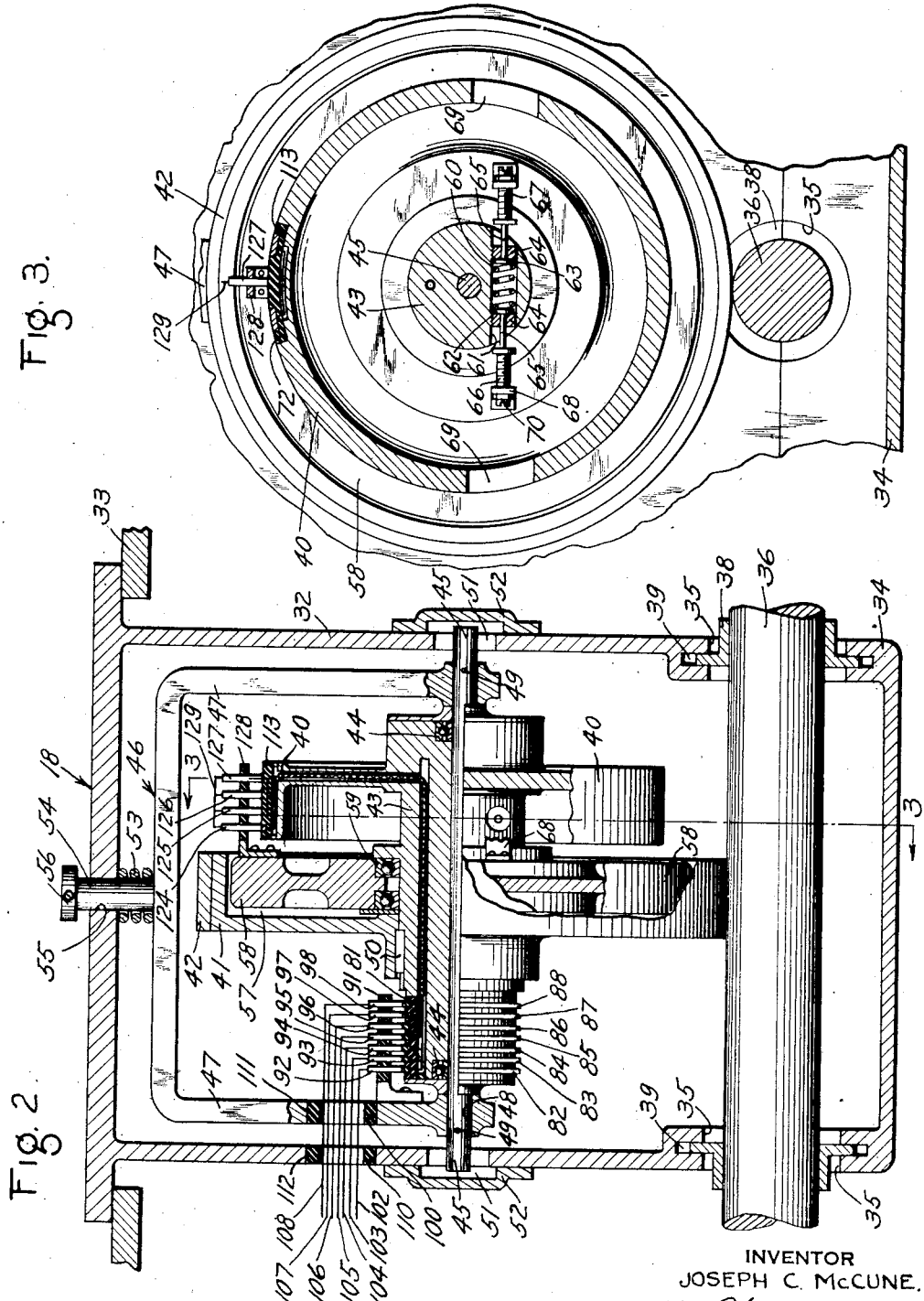

Oct. 11, 1938.   J. C. McCUNE   2,132,959
HIGH SPEED TRAIN CONTROL EQUIPMENT
Filed Nov. 19, 1936   5 Sheets-Sheet 3

INVENTOR
JOSEPH C. McCUNE.
BY Wm. M. Cady
ATTORNEY

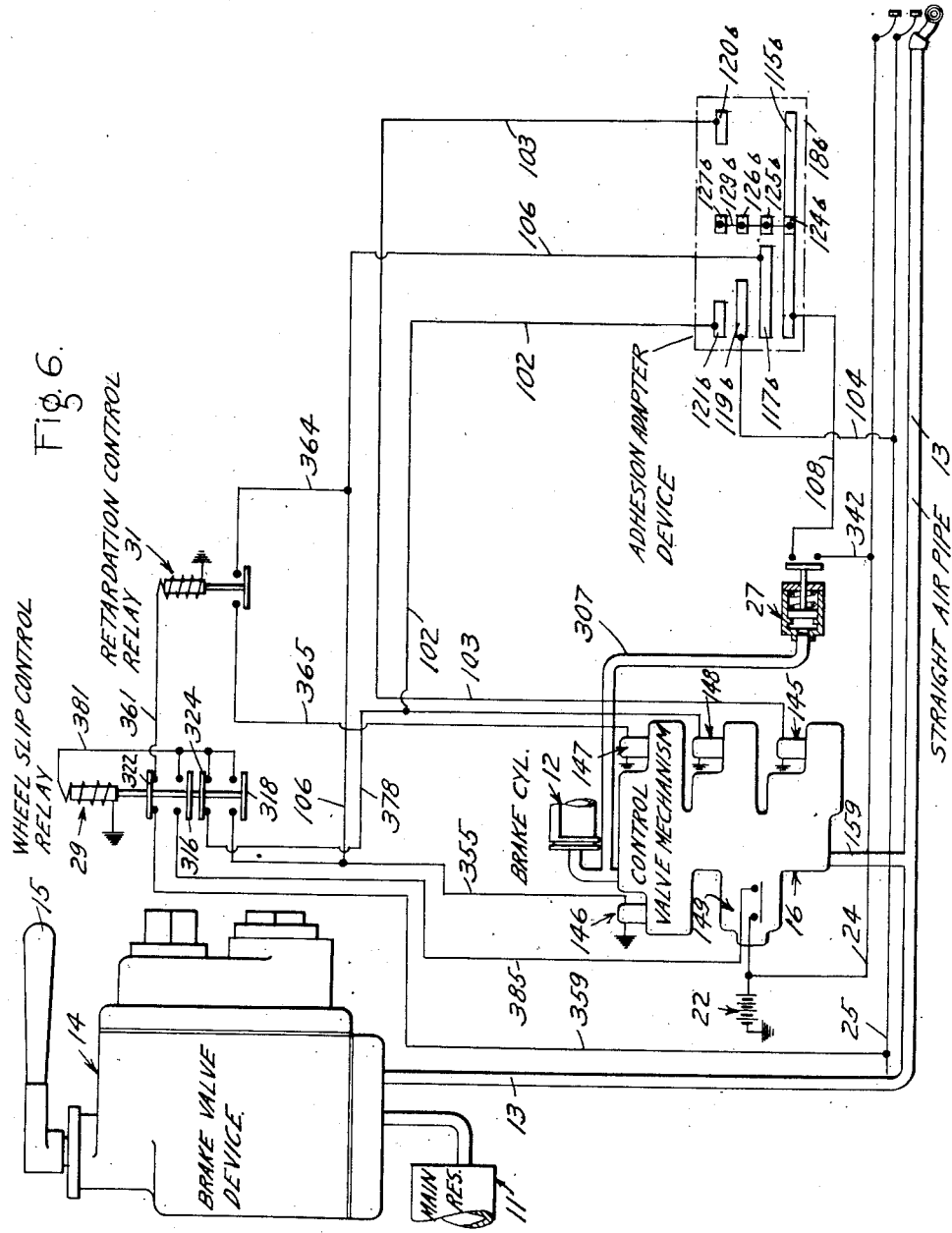

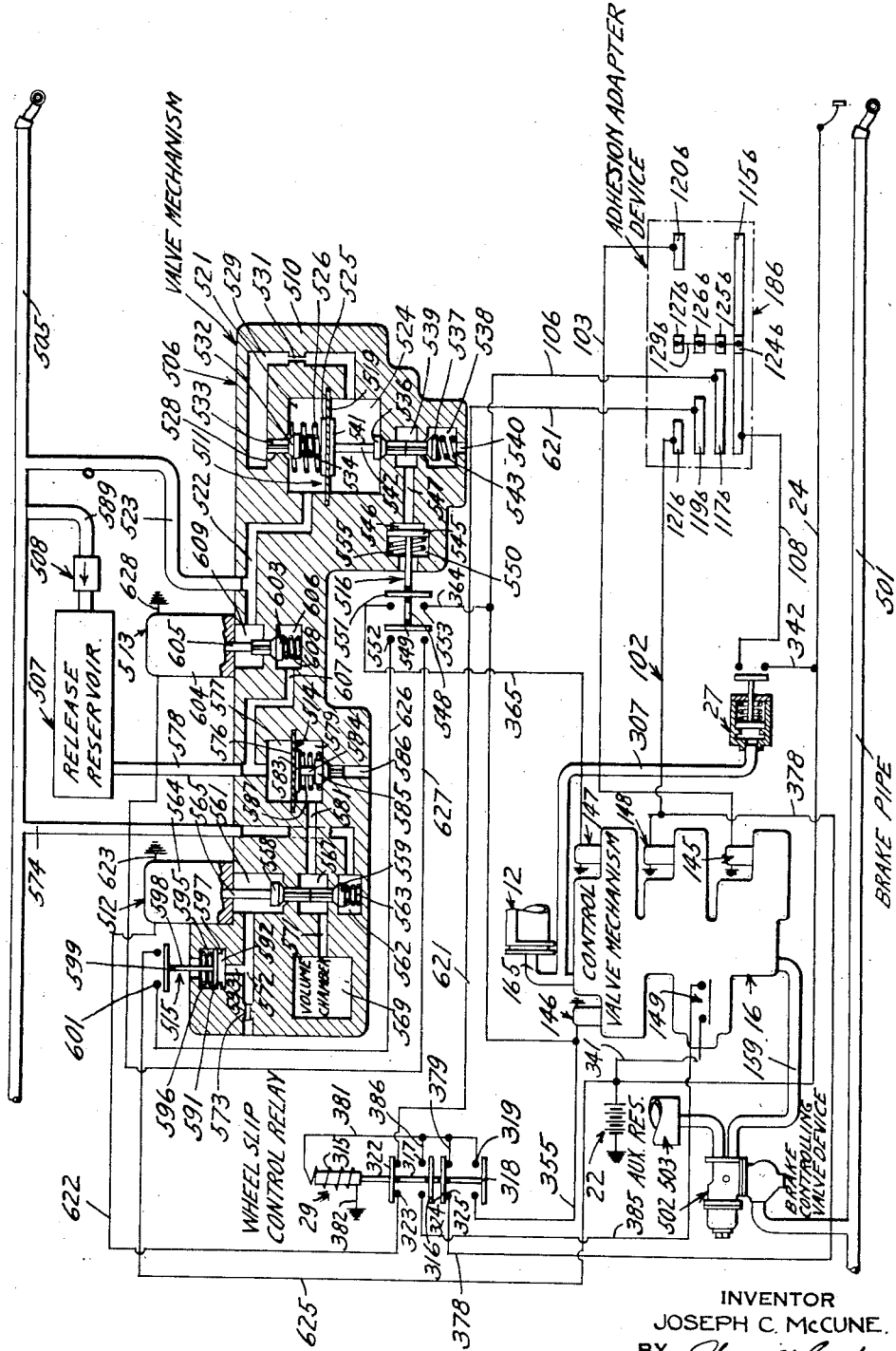

Patented Oct. 11, 1938

2,132,959

UNITED STATES PATENT OFFICE 2,132,959

HIGH SPEED TRAIN CONTROL EQUIPMENT

Joseph C. McCune, Edgewood, Pa., assignor to The Westinghouse Air Brake Company, Wilmerding, Pa., a corporation of Pennsylvania Application November 19, 1936, Serial No. 111,690

49 Claims. (Cl. 303—21)

This invention relates to high speed train brake control equipment and particularly to brake control equipment adapted to prevent sliding of the car wheels.

The problems incident to the adequate and safe braking of railroad trains which travel normally at heretofore unprecedented high speeds, for example in excess of one hundred miles per hour, are many and various. One of the most salient and important of these problems is the problem of preventing sliding of the car wheels, that is, a condition wherein the wheels are held frictionally against rotation, due to the application of the brake shoes to the car wheels with such excessive braking force as to overcome the adhesion between the wheels and the track rails while the train continues to travel along the rails.

Adhesion between a wheel and the rail along which it rolls is usually expressed as a coefficient of adhesion, which is the ratio between the maximum tangential retarding force that can be effective on a wheel without causing it to slide, and the weight or load pressing the wheel to the rail. The coefficient is usually expressed as per cent of the weight pressing the wheel to the rail.

Heretofore known high speed train brake control equipments which were designed to so control the application of the brakes as to prevent sliding of the car wheels are of two general types which may be designated as, (1) the speed-governor type and (2) the inertia-governor type.

The speed-governor type of retardation control equipment comprises essentially a governor device which is driven according to the speed of the train and which operates automatically, as the speed of the train reduces, to reduce the braking force on all the cars of the train in one or more steps so that, at the lower speeds, the braking force will be insufficient to cause sliding of the car wheels.

The inertia-governor type of control equipment comprises an inertia element which may be in the form of a pendulum, a mass on rollers, or a flywheel, which is actuated according to the rate of retardation of the train to reduce the braking force on all the cars of the train, as the speed of the train decreases, so that a substantially constant rate of retardation is maintained.

In the speed-governer type of brake control equipment, the braking force is controlled solely according to the speed of the train and accordingly no change in braking force occurs as long as the speed of the train remains constant. In the inertia-governor type of brake control equipment, the reduction in braking force with the reduction in train speed is not as arbitrary as in the speed-governor type, in view of the fact that the response of the inertia-governor is affected by the increase in the coefficient of friction between the brake shoes and the car wheels resulting from the reduction in the speed of the train and also from the reduction in the braking force applying the brake shoes to the car wheels.

Both types of equipment are designed to limit the maximum braking force to a degree which will not cause sliding of the wheels under what will hereinafter be termed "poor rail" conditions, that is, conditions under which the coefficient of adhesion between the car wheels and the track rails is a relatively low value, such as fifteen per cent. The maximum braking forces thus effective in the case of either type of equipment is, in most instances, actually less than might be applied without causing sliding of the wheels, since the usual condition is what will hereinafter be termed a "good rail" condition, that is, a condition under which there is a relatively high coefficient of adhesion between the car wheels and the track rails, such as twenty-five per cent.

It will be apparent, therefore, that in either the speed-governor type or inertia-governor type of brake control equipment, the maximum value of braking force is restricted to a value which is lower than might be applied without causing sliding of the wheels, in order to provide a factor of safety to guard against excessive sliding of the wheels at certain times. It follows, therefore, that the length of the stop, that is, the distance which the train travels from the time the application of the brakes is initiated until it is brought to a complete stop, is greater compared with what it would be if higher braking forces were applied.

In contrast to the principle of design and operation of the speed-governor and inertia-governor type of brake control equipment, namely, that the usual condition is a "poor rail" condition and that the "good rail" condition is the exception, the brake control equipments which I have devised are designed to operate on the assumption that the usual condition is a "good rail" condition and that the occurrence of a "poor rail" condition is the exception.

In arriving at this basic principle of my invention, I have been guided by the results of reliable tests carried on under various weather conditions over a period of months, which tests indicate that a relatively high coefficient of adhesion, such as twenty-five percent, may ordinarily be dependably realized at least seventy-five per cent of the time the train is in service.

The outstanding advantage of a brake control equipment designed in accordance with the basic principle stated above is that higher braking forces or braking ratios are permitted and thus a train may be stopped in a much shorter distance from a given high speed, without sliding of the wheels, as compared with the stopping distance capable of being effected by any of the types of brake control equipment for high speed trains heretofore proposed or known.

The penalty paid, in terms of stopping distance, by a brake control equipment designed to function on the basis of a single relatively low coefficient of adhesion between the wheels and the track rails has been appreciated to a certain extent by those working in the art and an improved type of inertia-governor device has been proposed which may be adjusted manually by the engineer or the driver of the train to increase or decrease the rate of retardation of the train, as regulated by the governor, accordingly as in the judgment of the operator, such adjustment may be safely made. However, in any case the operator or engineer will play safe and allow a certain margin of safety so that the inertia-governor will not permit a braking force to be effected which is apt to cause sliding of the wheels. Thus, due to this margin of safety, the benefit of an actually higher coefficient of adhesion is not fully taken advantage of, as reflected in the higher braking forces or braking ratios which might be effected without causing sliding of the wheels.

An additional characteristic of the inertia-governor type of brake control equipment for high speed trains is that the inertia-governor device is responsive to the rate of retardation of the train as a whole and does not register the individual rates of retardation of individual wheels or individual wheel-and-axle units. Sliding of an individual wheel or wheel-and-axle unit is accordingly not reflected in the operation of the inertia governor device in such manner as to cause a release of the brakes associated with the particular wheel or wheel-and-axle unit which is beginning to slip or which is actually sliding. As a matter of fact, the braking effect exerted by a car wheel which is sliding is less than that exerted by a car wheel which continues to roll and which has a maximum retarding force exerted thereon, as determined by the coefficient of adhesion between the wheel and the rail. It might thus happen that if a sufficient number of wheels or wheel-and-axle units begin to slide, the inertia-governor device will interpret the sliding wheel condition as a diminution in the braking effect and operate to increase the braking force, which is directly opposite to the effect which is desired, namely, a decrease in braking force.

In order to guard against sliding of the wheels by controlling the braking force applied to individual wheels or wheel-and-axle units, it has been proposed to provide an anti-wheel-sliding device which comprises an inertia body in the form of a fly-wheel which is normally driven according to the speed of the train and which shifts yieldingly relative to a driving element when an individual wheel or wheel-and-axle unit begins to slip, that is decrease from a speed corresponding to the speed of travel of the train to zero speed corresponding to a locked position. Such an anti-wheel-sliding device is disclosed and claimed in the copending application Serial No. 713,103 of Rankin J. Bush, filed February 27, 1934, now Patent 2,068,370, and assigned to the assignee of the present application. In the device disclosed in the copending Bush application, braking force, or braking ratio, as exemplified by brake cylinder pressure, is rapidly reduced at the time a wheel or wheel-and-axle unit begins to slip, so that before the wheel or wheel-and-axle unit actually reaches a locked condition, the brake cylinder pressure has been reduced to such an extent that the wheel or wheel-and-axle unit begins to accelerate back toward its normal speed, corresponding to the speed of travel of the train, whereupon the original braking force is restored.

One limitation of such an anti-wheel-sliding device is that, should the wheel or wheel-and-axle unit again begin to slip, upon the reapplication of the braking force, the braking force or brake cylinder pressure is again reduced, thereby wasting a considerable quantity of fluid pressure medium or air. On a single car or on a train consisting of two or three cars, such consumption of air might be tolerable, but on a relatively long train of fifteen or twenty cars, the total consumption of air from the fluid pressure system would be intolerable for the reason that the fluid pressure in the system might be dissipated or reduced to such an extent as to render the other remaining fluid pressure brakes inadequately effective.

In my present invention, I propose to employ a device which locally controls the braking force or brake cylinder pressure of individual wheels or wheel-and-axle units to immediately and rapidly reduce the braking force or brake cylinder pressure in the event that the wheel or wheel-and-axle unit begins to slip, but which, in contrast to the device of the copending application above mentioned, functions to permit the restoration of a braking force or brake cylinder pressure which is less than that which initiated the wheel slipping condition. As a result, a repetition of the wheel slipping condition is unlikely upon the reapplication of the braking force since the braking force has been diminished. Consequently, air is not repeatedly vented from the brake cylinder and thus undue and unnecessary waste of air and the reduction of the pressure in the fluid pressure system, even for long trains, is obviated.

In my prior copending application, Serial No. 718,376, filed March 31, 1934, there is disclosed and broadly claimed an equipment for releasing the brakes and controlling the degree of reapplication of the brakes on a vehicle wheel upon slipping of the wheel due to excessive application of the brakes; and the claims in this application covering this feature of my present invention are accordingly directed to the specific structure disclosed herein.

It is accordingly an object of my invention to provide brake control equipment for high speed trains which will enable shorter stopping distances, without causing sliding of the vehicle wheels, than have been obtainable by brake control equipment heretofore proposed.

Another object of my invention is the provision of a device which functions both in the capacity of a retardation controller for so regulating the braking force under ordinary conditions as to cause the train to be brought to a stop at a substantially constant and heretofore unattained maximum rate of retardation, and which functions when a wheel or wheel-and-axle unit begins to slip to inhibit or prevent sliding of the wheels.

Another object of my invention is to provide apparatus, including a device of the character described in the foregoing object, adapted to reduce brake cylinder pressure to prevent sliding of the wheels, with minimum wastage of fluid under pressure.

Another object of my invention is to provide an arrangement including the apparatus mentioned in the two foregoing objects which is adapted to function automatically for either a forward or backward direction of travel of a car or train.

Another object of my invention is the provision of a brake control equipment for high speed trains of the character indicated in the foregoing objects, in which the conversion of present-day standard equipment to the type of equipment which I propose may be accomplished in a relatively simple and inexpensive manner by employing the usual signal pipe of present-day equipment.

Figure 5:
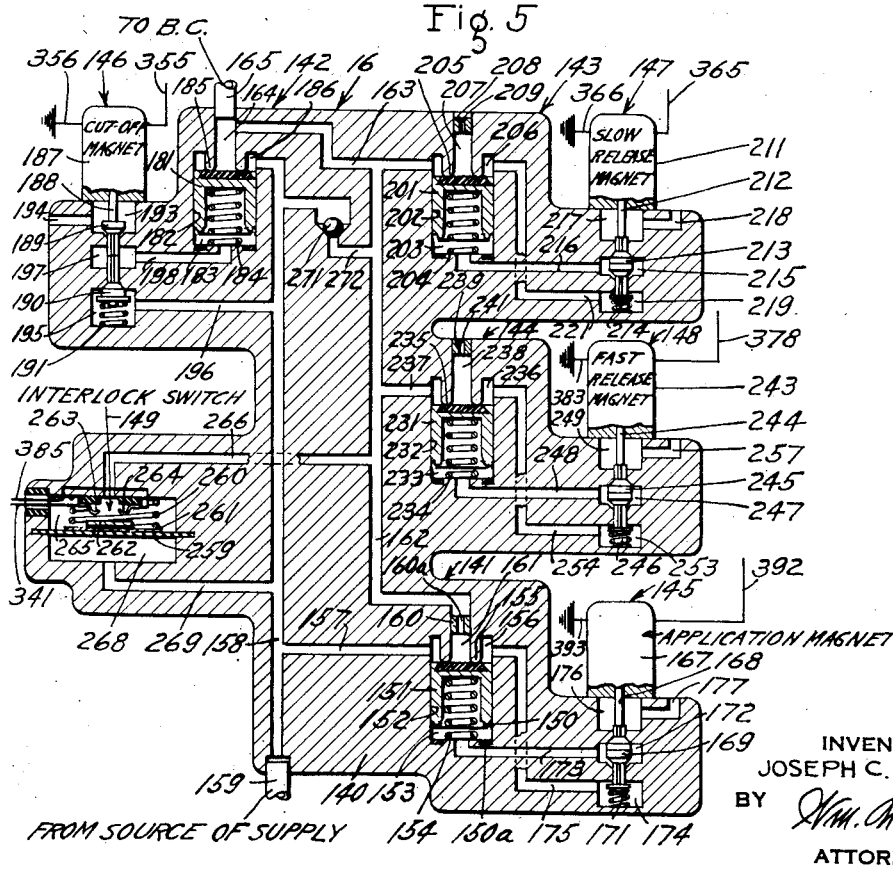

The above objects and other objects of my invention which will be made apparent hereinafter, are attained by means of several illustrative embodiments of my invention subsequently to be described and shown in the accompanying drawings wherein, Fig. 1 is a diagrammatic view, showing one embodiment of my invention in a double-end equipment adapted for travel of the car or train in a forward or backward direction, certain of the parts being shown in outline or in simplified form, Fig. 2 is a view, partly in section and partly in elevation with portions broken away showing in detail, the construction and method of mounting the adhesion adapter, indicated in simplified form in Fig. 1, Fig. 3 is a sectional view, taken on the line 3—3 of Fig. 2, showing in further detail the construction of the adhesion adapter, Fig. 4 is a diagrammatic view, showing the electrical connections between the collector rings at one end of the hub of the adhesion adapter device with the contact segments at the opposite end thereof, Fig. 5 is a diagrammatic sectional view, showing the essentials of the control valve mechanism, indicated in outline form in Fig. 1, Fig. 6 is a diagrammatic view, showing a brake control system which differs from that shown in Fig. 1 in that it is a single-end equipment rather than a double-end equipment, that is, it is adapted to operate for travel of the car or train in a forward direction only, and Fig. 7 is a diagrammatic view, showing a modified form of the brake control system shown in Fig. 6 and differing therefrom in that control of the equipment on successive cars of the train is effected through the medium of the familiar signal pipe present in the brake equipment of present-day railroad trains.

DESCRIPTION OF EQUIPMENT

Referring to Fig. 1 of the drawings, the embodiment shown comprises any conventional fluid pressure brake system, such as a straight-air system represented by a main reservoir 11, a brake cylinder 12, a pipe 13 hereinafter called the straight-air pipe and through which fluid under pressure is supplied to the brake cylinder 12, and a manually operable self-lapping brake valve device 14, of well known construction, such as shown in the Patent 2,042,112 of Ewing K. Lynn and Rankin J. Bush, for controlling the supply of fluid under pressure from the main reservoir 11 to the straight-air pipe 13 and brake cylinder 12 to cause application of the brakes and the release of fluid under pressure from the straight-air pipe 13 and brake cylinder 12 to release the brakes. It is deemed unnecessary for present purposes to describe the construction and operation of the self-lapping brake valve 14 in detail, it being necessary only to understand that the pressure established in the straight-air pipe 13 is in accordance with the degree of movement of the operating handle 15 of the brake valve device 14 from a normal release position into an application zone.

According to my invention, the equipment shown in Fig. 1 also includes a control valve mechanism 16 which is interposed between the straight-air pipe 13 and the brake cylinder 12 to control the supply of fluid under pressure from the straight-air pipe 13 to the brake cylinder 12 and the release of fluid under pressure from the brake cylinder in a manner subsequently to be described. A so-called adhesion adapter 18, indicated in simplified form in Fig. 1 and shown in detail in Figs. 2, 3 and 4, and a similar adhesion adapter 18a are provided for controlling the operation of the control valve mechanism 16, the adapter devices 18 and 18a being associated respectively with the front and rear axles of a wheel-truck. A pair of direction-determining relays 19 and 19a for rendering the adhesion adapter devices suitable for either forward or backward travel of the car or train, a suitable source of electric current, such as a battery 22, a pair of train wires 24 and 25, a pneumatic interlock switch 27, a retardation control relay 31, and a wheel-slip control relay 29 are also provided.

It will be understood that the equipment shown in Fig. 1 is adapted to control only the brakes for the particular wheel-truck with which the adhesion adapter devices 18 and 18a are associated. It will be understood that for simplicity, only one brake cylinder is shown together with associated control equipment including the control valve mechanism 16, the adhesion adapter devices 18 and 18a, and the relays 19, 19a, 29 and 31. Repetition of brake cylinders for successive wheel-trucks throughout the length of the train, together with repetition of control valve mechanism 16, adhesion adapters 18 and 18a, and relays 19, 19a, 29 and 31 for each control valve mechanism is accordingly deemed unnecessary. It will, furthermore, be understood that the brake control equipment comprising my invention may be embodied in any type of fluid pressure brake system and whether the cars of the train are of the articulated or the non-articulated or usual type.

(a) Adhesion adapters 18 and 18a

The adhesion adapter devices 18 and 18a are identical in construction and, accordingly, only the adapter device 18 will be described. The parts of the adhesion adapter device 18a will be understood to have the same reference numerals as for the device 18 except that the suffix "a" will be added. The adhesion adapter device 18 comprises a casing or housing 32 (Fig. 2) which is suitably mounted on and attached to a portion of the wheel-truck frame 33, the housing being split and having a lower portion 34 which is removably secured to the remainder of the housing. The separable portions of the housing 32 are provided with semi-circular recesses adapted to register when the portions are secured together to form openings 35 in each side of the housing through which an axle 36 of the wheel-truck extends. In the case of the adapter device 18, the axle 36 is the front or leading axle of the truck. In the case of the adapter device 18a, the axle is the rear or following axle of the same wheel-truck. The openings 35 in the housing 32 are sufficiently larger in diameter than the diameter of the axle 36 that the usual movement of the axle relative to the wheel-truck is not interfered with. Suitable split packing rings 38 are provided for each of the openings 35, the rings 38 having annular flanges substantially perpendicular to the axis of the axle which engage in circular grooves 39 formed in the housing 32 at the openings 35, the groove 39 being sufficiently large in diameter to permit the up and down movement of the axle with respect to the housing without interfering with the sealing function of the packing ring.

Contained within the housing 32 is a wheel 40, having a hub 43 which is provided at each end with suitable bearings, such as the ball bearings 44, for rotatively mounting the hub and wheel 40 on a shaft or rod 45 which is, in turn, carried on a yoke 46 suitably mounted within the housing. The yoke 46 has two prongs 47, there being suitable openings 48 at the end of the prongs through which the shaft 45 extends. Suitable pins 49 extend transversely through the shaft 45 at each end so as to secure the shaft 45 against movement relative to the yoke 46.

The shaft 45 is of such length that the ends thereof project beyond the prongs 47 and engage in suitable vertical slots or openings 51 in the opposite side walls of the housing 32.

The slots 51 conform closely in width to the diameter of the shaft 45 so as to prevent lateral movement of the yoke 46 in the housing while at the same time permitting movement of the yoke relative to the housing 32 in opposite directions longitudinally of the slots 51.

Suitable cover plates 52 may be provided to cover the openings 51 to prevent the entrance of dust or dirt particles into the interior of the housing 32.

Detachably secured to hub 43, as by a key 50, is a driving wheel 41 having a rim 42 of friction material attached thereto. The yoke 46 is yieldingly urged toward the axle 36 by a relatively heavily tensioned coil spring 53, which is interposed between the top wall of the housing and the central or base portion of the yoke 46, the rim 42 of the wheel 41 being accordingly yieldingly urged into frictional contact with the outer surface of the axle 36 so as to maintain the axle and the wheel 41 in driving engagement. The wheel 41, the hub 43, and the wheel 40 are thus driven or rotated in accordance with rotation of the axle 36, that is, at a speed corresponding to the speed of rotation of the car wheels. It will be understood that the wheel 41 may be driven by rotation of the axle 36 in any other suitable manner, as by gear or pulley and belt arrangements.

The spring 53 encircles and is, in part, held in position by a projecting stem 54, secured or attached to the central portion of the yoke, which stem 54 extends through an opening 55 in the top wall of the housing and is slidable therein whereby to guide and support the upper or base end of the yoke. A removable collar 56 may be secured to the end of the stem 54 for engaging the top surface of the housing 32 and thereby limiting the extent of the movement of the yoke and the wheel toward the axle 36 under the influence of the spring 53. The openings 51, however, may be so positioned and of such length as to perform this function without the aid of the collar 56, the engagement of the shaft 45 with the side walls of the housing 32 at the end of the openings 51 toward the axle, serving the same purpose.

The driving wheel 41 has an annular recess 57, in one face thereof, surrounding the hub 43. Positioned within the recess 57 is an inertia body, in the form of a flywheel 58, which is suitably mounted for rotative movement relative to the hub 43 and wheel 40, as by ball bearings 59 interposed between the outer surface of the hub 43 and the central opening in the hub portion of the fly-wheel.

A resilient yielding connection between the fly-wheel 58 and the hub 43 is provided, according to my invention, by means of a suitable coil spring 60 contained in a transverse bore 61 extending through the hub 43 to one side of the shaft 45. The spring 60 is interposed between a pair of discs 62 and 63 for urging them in opposite directions outwardly of the bore 61, the discs being held in the bore by means of set screws 64 screwed into the opposite ends of the bore. Each of the discs 62 and 63 is provided with a stem 65 attached to or formed integral therewith, which extends through a suitable central opening in the corresponding set screw 64 and projects out of the bore 61 beyond the periphery of the hub 43.

A pair of adjustable stop screws 66 and 67 are attached to the hub portion of the fly-wheel 58 as by angle brackets 68 in such manner that the stop screw 66 is in coaxial relation to the stem of disc 62, with the inner end of the stop screw engaging the outer end of the stem of the disc 62, while the stop screw 67 is in coaxial relation to the stem of the disc 63 with the inner end of the stop screw engaging the outer end of the stem of the disc 63.

The stop screws 66 and 67 are screwed into suitable threaded openings in the angle brackets 68 and may be adjusted inwardly or outwardly, as by a screw driver engaging the outer end thereof, to vary the tension of the coil spring 60. In order to enable adjustment of the stop screws 66 and 67 with comparative ease, the outer rim of the wheel 40 is provided with suitable openings 69 therein in line with the stop screws 66 and 67 to enable the shank of a screw driver to extend therethrough to the outer end of the stop screws. Suitable lock nuts 70 are provided for locking the set screws 66 and 67 in position after they are adjusted to the proper position.

The tension in the spring 60 may also be varied by turning the set screws 64 inwardly or outwardly of the bore 61. The stop screws 66 and 67 are then adjusted into contact with the rounded ends of the stems 65 of the discs 62 and 63, respectively, so as to prevent any lost motion or play between the fly-wheel and the hub 43.

It will thus be apparent that upon acceleration of the driving wheel 41 and hub 43 relative to the fly-wheel 58, the coil spring 60 yieldingly resists inward movement of one or the other of the discs 62 or 63, the degree of rotative movement of the fly-wheel relative to the hub being dependent upon the tension of the spring 60 and upon the rate of acceleration of the driving wheel 41. On the other hand, if the driving wheel 41 is retarded, the fly-wheel 58 tends to rotate relative thereto in the opposite direction, against the force of the spring 60, to a degree dependent upon the rate of retardation of the wheel 41. When the driving wheel 41 is rotating at a substantially constant rate of speed without any change in the speed thereof, the fly-wheel 58 assumes a normal or neutral position with respect to the hub, as shown in Figs. 2 and 3.

By providing a single spring 60, instead of a plurality of different springs, a uniform degree of shifting of the fly-wheel 58 in either direction relative to the hub 43, for the same rate of retardation or acceleration is secured.

Suitably secured to and encircling the outer surface of one end of the hub 43 is a ring 81 of insulating material having a plurality of peripheral grooves spaced longitudinally of the hub in which are received a plurality of collector rings 82, 83, 84, 85, 86, 87 and 88.

Suitably mounted on one prong 47 of the yoke 46, as by a bracket 91 attached to the prong, are a plurality of brushes, 92, 93, 94, 95, 96, 97 and 98 arranged in a row for contacting the collector rings 82 to 88, respectively, the usual brush holders and biasing springs for the brushes being omitted for simplification. Suitable flexible wires, 102, 103, 104, 105, 106, 107 and 108 are connected to the brushes 92 to 98, respectively. The wires 102 to 108 extend from the brushes 92 to 98 through an opening 100 in one prong 47 of the yoke 46, in which opening is a bushing 111 of insulating material, and thence to the exterior of the housing 32 through an opening 110 in the housing having an annular bushing 112 of insulating material secured therein. Suitable calking or sealing material may be provided to support the wires in the bushings 111 and 112 as well as to prevent the entrance of dust or dirt into the interior of the housing 32. The individual wires 102 to 108 are provided with suitable insulation to guard against short-circuiting of the brushes 92 to 98.

Suitably secured in a recess 72 in the outer surface of the rim of the wheel 40 is an arcuate segment 113 of insulating material having spaced parallel grooves therein, in which are removably and adjustably secured (see Fig. 4) a plurality of switch members in the form of arcuate contact segments 115, 116, 117, 118, 119, 120 and 121. The contact segments 116, 118 and 120 are disposed on one side and the segments 117, 119 and 121 on the opposite side of a neutral plane which extends through the mid-point of the segment 115 in perpendicular relation to the longitudinal axis of the segment 115. The contact segment 116 is in alignment with the segment 117, the segment 118 is in alignment with the segment 119, and the segment 120 is in alignment with the segment 121.

The inner ends of the segments 116 and 117 are equidistant from the neutral plane, as are the inner ends of the segments 118 and 119, and the inner ends of the segments 120 and 121. The distance from the neutral plane to the inner end of segments 116, 118 and 120, respectively, is successively greater, and the distance from the neutral plane to the inner end of the segments 117, 119 and 121, respectively, is correspondingly successively greater.

A plurality of switch members in the form of brushes 124, 125, 126 and 127, which are connected in short-circuited relation by a strap or wire 129 and mounted suitably in insulated relation on the fly-wheel 58, as by a bracket 128 attached to the one side of the fly-wheel near the outer rim thereof, are provided for cooperating with the switch members or contact segments 115 to 121. The brushes 124 to 127 are arranged in a row parallel to the longitudinal axis of the hub 43 and, in the normal position of the fly-wheel 58 with respect to the wheel 40, are so positioned as to be in the neutral plane bisecting the arcuate contact segment 115.

The brush 124 normally engages the segment 115 at the mid-point thereof and continuously engages the contact segment 115 as the fly-wheel 58 shifts in either direction relative to the wheel 40. The brush 125 is in alignment with the contact segments 116 and 117, the brush 126 is in alignment with the contact segments 118 and 119, and the brush 127 is in alignment with the contact segments 120 and 121. The brushes 125, 126 and 127 are normally out of contact with the segments and are positioned mid-way between the inner ends of the segments in alignment therewith.

Contact segments 115, 116, 117, 118, 119, 120, and 121 are connected to the collector rings 88, 87, 86, 85, 84, 83, and 82, respectively, by wires 135, 136, 137, 138, 139, 140, and 141, respectively, as shown in Fig. 4. The wires 135 to 141 extend from the collector rings 82 to 88 to the contact segments 115 to 121 through a suitable longitudinal passage in the hub 43 and a radial passage in the web of the wheel 40, as shown in Fig. 2.

As will be explained hereinafter in further detail, the wire 108, which is connected to the brush 98 contacting the collector ring 88, is connected to one terminal of a source of current, such as the battery 22, by pneumatic switch device 27 upon an application of the brakes. Accordingly, the arcuate contact segment 115 on the wheel 40, which segment is constantly connected to the collector ring 88, is also connected to the same terminal of the battery. In view of the fact that the brush 124 constantly engages the contact segment 115 and in view of the fact that the brushes 124 to 127 are connected in short-circuited relation by the wire 129, it will be apparent that all of the brushes 124 to 127 are thereby also connected to the same terminal of the battery.

It will also be apparent that when the brushes 124 to 127 are shifted out of the neutral position thereof in either of the two opposite directions, the brushes 125, 126 and 127 successively engage the associated contact segments 116, 118 and 120 or 117, 119 and 121, respectively, to close certain circuits which will be hereinafter described and which include battery 22.

For purposes of simplification, the collector rings 82 to 88 and the associated brushes 92 to 98 of the adhesion adapter devices 18 and 18a have been omitted from Fig. 1, and instead of the wires 102 to 108 being connected directly to the brushes 92 to 98, respectively, they have been indicated as connected directly to the arcuate contact segments 121, 120, 119, 118, 117, 116, 115, respectively. Likewise, contact segments 115a to 121a of the adhesion adapter device 18a, which segments correspond to the contact segments 115 to 121, respectively, of the adhesion adapter device 18, are indicated as having circuit connections directly thereto instead of through collector rings.

The adhesion adapter device 18a is connected in parallel relation to the adhesion adapter device 18, contact segment 115a being connected to the wire 108 by a branch wire 108a, the arcuate contact segments 117a, 119a, and 121a being connected by branch wires 106a, 104a, and 102a, respectively, to the wires 106, 104, and 102, respectively, and the contact segments 116a, 118a, and 120a being connected by branch wires 107a, 105a, and 103a, respectively, to the wires 107, 105, and 103, respectively.

The coil spring 60 which resists relative movement between the fly-wheel 58 and the wheel 40 is so designed and so adjusted in tension and the arcuate contact segments 116 to 121 are so disposed and arranged that contact between the brush 125 and the inner end of the segments 116 or 117 occurs only when the rate of retardation of the car wheels which are fixed to the axle 36 associated with the adhesion adapter device 18 attains the rate of, for example, 5.5 miles per hour per second. The arrangement of the segments 118 and 119 is such that the brush 126 does not engage the inner ends thereof until the rate of retardation, produced on the car wheels of the axle 36 associated with the adhesion adapter device 18, attains the rate of, for example, 6.6 miles per hour per second.

The arrangement of the segments 120 and 121 is such that the brush 127 does not engage the inner end of the segments unless the rate of retardation produced on the car wheels of the axle associated with the adhesion adapter device 18 attains a rate in excess of, for example, 7.7 miles per hour per second, such as would result if the car wheels began to slip, that is decrease in speed from the speed of rotation corresponding to the speed of travel of the car or train, toward zero speed corresponding to the locked condition of the car wheels.

If the wheel 40 accelerates with respect to the fly-wheel 58, the engagement of the brushes 125, 126 and 127 with the segments 117, 119 and 121 or with the segments 116, 118 and 120 will occur at rates of acceleration corresponding to the rates of retardation above described.

The rates of acceleration or retardation of the car wheels at which the initial contact of the brushes 125, 126 and 127 with the segments 117, 119 and 121, or 116, 118 and 120, is effected, may be varied by adjusting the tension of the spring 60 or by adjusting the position of the segments relative to the brushes 124 to 127. The degree of tensioning of spring 60 and the required adjustment of the segments 116 to 121 to secure contact of the brushes and segments at particular rates of acceleration or deceleration may be determined in any suitable manner, as by comparison with an electric motor of known acceleration characteristics.

It will thus be seen that, depending upon the direction of travel of the car or train at the time an application of the brakes is initiated, and depending upon whether the car wheels are being retarded or accelerated, the contact segments 117, 119 and 121, or 116, 118 and 120, may act as retardation contact segments or acceleration contact segments.

In order, therefore, to determine automatically whether the engagement of the brushes 125, 126 and 127 with the segments 116 to 121 associated therewith is due to retardation of the car wheels or to acceleration of the car wheels, the relays 19 and 19a are provided, these relays being thus aptly termed direction-determining relays. The manner in which the relays 19 and 19a function will be described hereinafter.

(b) Control valve mechanism 16

The control valve mechanism 16, as shown in Fig. 5, comprises a suitable sectionalized casing 140 whereby the parts of the valve mechanism may be readily assembled and disassembled. For the sake of simplicity, however, the casing 140 is illustrated without regard to sectionalization or construction whereby the parts may be assembled and disassembled.

Suitably assembled and arranged in the casing 140 are an application valve device 141, a cut-off valve device 142, a slow release valve device 143 and a fast release valve device 144, the valve devices 141 to 144 being controlled, respectively, by magnet valve devices 145, 146, 147 and 148. Also embodied in the casing 140 is a fluid pressure differential responsive interlock switch device 149.

The application valve device 141 comprises a valve piston 151, slidably operative in a bore 152 and having, at one side thereof, a chamber 153 containing a coil spring 154 which is interposed between the valve piston and the casing for yieldingly urging the valve piston into seated relation on an annular rib seat 155. At the outer seated area of the valve piston 151 is an annular chamber 156 which is connected by a branch passage 157 to a supply passage 158 in the casing 140. The passage 158 is supplied with fluid under pressure from a suitable source, which in the embodiment shown in Fig. 1 is the straight-air pipe 13, through a branch pipe 159. Formed on the valve piston 151 is an annular rib 150 which seats on an annular gasket 150a, whenever the piston is shifted away from the seat 155, to prevent leakage of fluid under pressure past the valve piston.

Opening at the inner seated area of the valve piston 151 is a passage or chamber 161, which contains a choke fitting 160 having a restricted port 160a therein and which is connected by a passage 162 to a passage 163 leading to and opening into a chamber 164 to which the brake cylinder 12 may be connected, as by a branch pipe 165.

The application magnet valve device 145 comprises an electro-magnet 167 effective, when energized, to actuate a plunger or stem 168 to shift a double beat valve 169 from an upper associated valve seat to a lower associated valve seat, against the force of a biasing spring 171. The double beat valve 169 is contained in a chamber 172 which is constantly connected to the chamber 153 at one side of the valve piston 151 by a passage 173. When the double beat valve 169 is seated on its upper valve seat it establishes communication past its lower valve seat from the chamber 172 to a chamber 174, containing the biasing spring 171 and connected by a passage 175 to the annular chamber 156 at the outer seated area of the valve piston 151. When the double beat valve 160 is in seated relation on its lower valve seat it cuts off communication between the chambers 172 and 174 at the lower valve seat and opens communication from the chamber 172 past its upper valve seat to a chamber 176 which is constantly open to atmosphere through a port 177.

It will, accordingly, be seen that when the electromagnet 167 of the application magnet valve device 145 is deenergized, the double beat valve 169 is unseated from its lower valve seat by spring 171 and thus establishes communication from the annular chamber 156 to the chamber 153, thereby effecting equalization of fluid pressures therein and rendering the biasing spring 154 effective to maintain the valve piston 151 seated on the annular rib seat 155. It will also be seen that when the electromagnet 167 of the application magnet valve device 145 is energized, the double beat valve is unseated from its upper valve seat and thus establishes communication through which fluid under pressure is vented from the chamber 153 at one side of the valve piston 151. The higher pressure of fluid in the annular chamber 156 acting on the opposite side of the valve piston 151 thus becomes effective to overcome the tension of the biasing spring 154 and shift the valve piston 151 away from the annular rib seat 155 to open communication between the annular chamber 156 and the chamber 161.

The cut-off valve device 142 comprises a valve piston 181 slidably operative in a bore 182 and having at one side thereof a chamber 183 containing a coil spring 184, which is interposed between valve piston 131 and the casing for yieldingly urging the valve piston 181 into seated relation on an annular rib seat 185. At the outer seated area of the valve piston 181 is an annular chamber 186 into which the fluid pressure supply passage 158 opens. The inner seated area of the valve piston 181 is open to the chamber 164 which, as previously described, is connected to the brake cylinder 12 by the branch pipe 165.

The cut-off magnet valve device 146, which controls the operation of the cut-off valve device 142, comprises an electromagnet 187 which is effective when energized to actuate a plunger or stem 188, to shift a pair of oppositely seating valves 189 and 190 against the force of a biasing spring 191. The valve 189 is contained in a chamber 193, which is constantly open to atmosphere through a port 194, and the valve 190 is contained in a chamber 195, which is constantly connected to the fluid pressure supply passage 158 through a branch passage 196. The fluted stems of the valves 189 and 190 meet in end-to-end contact within a chamber 197 located between the chambers 193 and 195, the chamber 197 being constantly connected to the chamber 183 at one side of the valve piston 181 by a branch passage 198.

When the electromagnet 187 of the cut-off magnet valve device 146 is deenergized, the biasing spring 191 is effective to seat the valve 190 and unseat the valve 189, thereby causing the seated valve 190 to cut off communication from the chamber 195 to the chamber 197 and causing communication to be established past the unseated valve 189 from the chamber 197 and the connected chamber 183 to the atmospheric chamber 193. It will thus be apparent that, with the electromagnet 187 deenergized, the chamber 183 of the cut-off valve device 142 is vented and consequently fluid under pressure supplied into the passage 158 will be effective to unseat the valve piston 131 and flow through chamber 164 and pipe 165 to the brake cylinder 12.

The electromagnet 187, when energized, causes the valves 189 and 190 to be shifted into seated and unseated positions respectively. The seated valve 189 thus cuts off communication from the chamber 197 and the connected chamber 183 to the atmospheric chamber 193, and the unseated valve 190 opens communication from the chamber 195 and the connected passage 158 to the chamber 197 and its connected chamber 183. If fluid under pressure is now supplied from passage 158 simultaneously to the chamber 183 and the annular chamber 186, the biasing spring 184 is effective to maintain the valve piston 181 seated on the annular rib seat 185 to prevent the supply of fluid under pressure from the passage 158 to the brake cylinder 12 past the valve piston 181.

The slow release valve device 143 comprises a valve piston slidably operative in a bore 202 and having a chamber 203 at one side thereof containing a biasing spring 204 which is interposed between the valve piston and the casing for yieldingly urging the valve piston into seated relation on an annular rib seat 205. At the outer seated area of the valve piston 201 is an annular chamber 206 to which the passage 163 leading from the chamber 164 is connected.

At the inner seated area of the valve piston 201 is a chamber or passage 207, which is open to atmosphere through a choke fitting 208 having a restricted port 209 therein.

The slow release magnet valve device 147 comprises an electromagnet 211 which is effective, when energized, to actuate a plunger or stem 212 to shift a double beat valve 213 against the resistance of a biasing spring 214 away from seated relation on an upper valve seat into seated relation on a lower valve seat. The double beat valve 213 is contained in a chamber 215 which is constantly connected by a passage 216 to the chamber 203 at one side of the valve piston 201. When the electromagnet 211 of the slow release magnet valve device 147 is deenergized, the biasing spring 214 shifts the double beat valve 213 into seated relation on its upper valve seat and unseats it from its lower valve seat thereby closing communication past the upper valve seat from the chamber 215 to a chamber 217, which is constantly connected to atmosphere through a port 218, and opening communication past its lower valve seat from the chamber 215 to a chamber 219 containing the biasing spring 214 and constantly connected to the annular chamber 206 by a passage 221.

It will be apparent that when the electromagnet 211 of the slow release magnet valve device 147 is deenergized, the fluid pressures in the chambers 206 and 203 at opposite sides of the valve piston 201 are equalized and thus the spring 204 is effective to maintain the valve piston 201 seated on the annular rib seat 205. When the electromagnet 211 is energized, however, communication between the chambers 206 and 203 is closed and the chamber 203 is vented to atmosphere. Thus a higher fluid pressure exerted in the annular chamber 206 overcomes the tension on the spring 204 and unseats the valve piston 201 from the annular rib seat 205 to open communication from the brake cylinder to atmosphere by way of branch pipe 165, chamber 164, passage 163, passage 207 and restricted port 209 in the choke fitting 208.

The cross-sectional area of the restricted port 209 in the choke fitting 208 is such as to cause fluid under pressure to be released from the brake cylinder at a certain rate which will hereinafter be termed a slow rate.

The fast release valve device 144 comprises a valve piston 231 slidably operative in a bore 232 and having a chamber 233 at one side thereof containing a biasing spring 234 which is interposed between the valve piston 231 and the casing for yieldingly urging the valve piston 231 into seated relation on an annular rib seat 235. At the outer seated area of the valve piston 231 is an annular chamber 236 which is constantly connected by a branch passage 237 to the passage 162 that is constantly connected to the brake cylinder 12 through passage 163, chamber 164 and pipe 165. At the inner seated area of the valve piston 231 is a chamber or passage 238 which is open to atmosphere through a choke fitting 239 having a restricted port 241 therein. The choke fitting 239 is similar in appearance to the choke fitting 208 but the restricted port 241 has a larger cross-sectional area than the restricted port 209 for a reason which will be hereinafter made apparent.

The fast release magnet valve device 148 comprises an electromagnet 243 which is effective, when energized, to actuate a plunger or stem 244 to shift a double beat valve 245 against the resistance of a biasing spring 246 from seated position on its upper valve seat to seated position on its lower valve seat. The double beat valve 245 is contained in a chamber 247 which is constantly connected by a passage 248 to chamber 233 at the one side of the valve piston 231.

When the electromagnet 243 is deenergized, the spring 246 urges the double beat valve into seated relation on its upper valve seat and unseats it from its lower valve seat, communication thus being cut off at the upper valve seat from the chamber 247 to a chamber 249, which is constantly open to atmosphere through a port 251, and communication being established past the lower valve seat from the chamber 247 to a chamber 253 containing the spring 246 and constantly connected by a passage 254 to the annular chamber 236.

Thus, with the electromagnet 243 deenergized, the fluid pressures in the annular chamber 236 and in the chamber 233 at opposite sides of the valve piston 231 are equalized and the spring 234 is effective to maintain the valve piston 231 seated on the annular rib seat 235. When the electromagnet 243 is energized, however, the connection between the chambers 236 and 233 is closed and the chamber 233 is vented to atmosphere through the port 251. Accordingly, if the fluid pressure in the chamber 236 is higher than the pressure in the chamber 233 to a sufficient degree to overcome the tension of the spring 234, the valve piston 231 is unseated from the annular rib seat 235 and fluid under pressure is accordingly released to atmosphere from the annular chamber 236 and the brake cylinder 12 connected thereto, through the restricted port 241 in the choke fitting 239.

The purpose of the increased cross-sectional area of the restricted port 241, as compared to the cross-sectional area of the restricted port 209 in the choke fitting 208 will now be apparent for obviously the restricted passage 241 enables a faster release of fluid under pressure and consequently a faster reduction in the pressure in the brake cylinder 12 than does the restricted port 209.

The fluid pressure interlock switch device 149 comprises a movable abutment, such as a diaphragm 259 suitably mounted in the casing 140 and carrying on one face thereof a follower 261 having in insulated relation thereon a contact bridging member 262, which is adapted to engage and connect in circuit-closing relation a pair of spaced insulated contact fingers 263 and 264 that are mounted on the casing within a chamber 265 at one side of the diaphragm 259. A coil spring 260 contained in chamber 265 and interposed between the follower on the diaphragm and the casing normally yieldingly urges the diaphragm downwardly so that the contact member 262 disengages the contact fingers 263 and 264.

The chamber 265 is constantly connected by a branch passage 266 to the passage 162 which, as previously described, is constantly in communication with the brake cylinder 12. At the opposite side of the diaphragm 259 is a chamber 268 which is constantly connected to the supply passage 158 by a branch passage 269.

The contact of the contact bridging member 262 with the contact fingers 263 and 264 and the disengagement of the contact member 262 from the contact fingers 263 and 264 is controlled by the differential fluid pressure in the chambers 265 and 268 at opposite sides of the diaphragm 259. The tension of the coil spring 260 is such that when the pressure in the chamber 268 exceeds the pressure in the chamber 265 by a small amount such as two or three pounds per square inch, the diaphragm is flexed upwardly against the yielding resistance of the spring 260 into contact with the contact fingers 263 and 264. Conversely, if the pressure in the chamber 265 is substantially equal to or exceeds the pressure in the chamber 268, the spring 260 is effective to shift the diaphragm 259 downwardly and thus cause the contact member 262 to disengage the contact fingers 263 and 264.

The circuits controlled by and the function of the interlock switch 149 will be made apparent hereinafter.

A one-way or check valve, shown as a ball check valve 271, is provided in a passage 272 connecting the passages 158 and 162, the check valve 271 being effective to prevent flow of fluid under pressure through the passage 272 from the supply passage 158 to the brake cylinder passage 162 but adapted to unseat and permit reverse flow from the passage 162 to the passage 158 for a purpose hereinafter made apparent.

(c) *Additional equipment*

Energization and deenergization of the application magnet valve device 145, the cut-off magnet valve device 146, the slow release magnet valve device 147 and the fast release magnet valve device 148 of the control valve mechanism 16 is controlled by operation of the adhesion adapter devices 18 and 18a through the medium of electrical circuits which are conditioned, depending upon the car or train traveling in a forward or a backward direction at the time the application of the brakes is initiated, by the direction-determining relays 19 and 19a. The relays 19 and 19a are shown in diagrammatic form and it will be understood that any suitable type of relay may be provided. It will also be understood that instead of a single relay such as the relay 19 or the relay 19a, a plurality of simultaneouusly energized and deenergized relays may be provided, the sum total of the contacts or switch members of all the relays corresponding to the total number of contact or switch members indicated by the relays 19 and 19a.

As illustrated, the relay 19 comprises an electromagnet 275 having an associated magnetic core, not shown, and adapted when energized to actuate a plurality of contact members 276, 277, 278, 279 and 281 into circuit-closing contact with respectively associated pairs of spaced insulated contact fingers 282, 283, 284, 285 and 286, respectively. Relay 19 also comprises a pair of movable contact members 288 and 289, which are normally in circuit-closing contact with associated pairs of insulated contact fingers 291 and 292 when the electromagnet 275 is deenergized, and which are shifted out of engagement with the associated contact fingers upon the energization of the electromagnet 275.

The relay 19a being identical in construction to the relay 19 will not be described in detail except to point out that corresponding parts in the two relays will be designated by the same reference numeral as in the description of the relay 19 except for the addition of the suffix "a".

The method of controlling the relays 19 and 19a and the function thereof will be made apparent hereinafter.

The pneumatic switch device 27 may be of any suitable construction such that, upon the supply of fluid under pressure thereto, it is actuated to circuit-closing position and upon the release of fluid under pressure therefrom it is actuated to circuit-opening position. As illustrated, the switch device 27 may comprise a suitable casing 301 containing a piston 302 having a stem 303 which carries in insulated relation thereon a contact member 304 adapted to engage a pair of insulated contact fingers 305 in circuit-closing relation, when fluid under pressure is supplied to a chamber 306 at one side of the piston. The pneumatic switch device 27 may be arranged in any suitable manner for operation to circuit-closing position whenever fluid under pressure is supplied to the brake cylinder 12, as by a branch pipe 307 which connects the chamber 306 to the pipe 165, leading to the brake cylinder 12.

A spring 308 contained in a chamber 309 at the side of the piston 302 opposite to the chamber 306 and interposed between the face of the piston and the casing 301, yieldingly resists shifting of the piston by the pressure of the fluid supplied to the chamber 306, and is effective whenever the pressure in the chamber 306 is reduced below a relatively low pressure, such as two or three pounds per square inch, to shift the piston in a left-hand direction into contact with a stop lug 310 formed on or secured to the casing 301, in which position of the piston, the contact member 304 is disengaged from contact fingers 305.

The wheel-slip control relay 29 and the retardation control relay 31 may be of any suitable construction. The relay 29 is illustrated diagrammatically as comprising an electromagnet 315 having associated therewith in the usual manner a magnetic core, not shown, and effective when energized to actuate a pair of movable contact members 316 and 318 into circuit-closing engagement with respectively associated pairs of insulated contact fingers 317 and 319, and at the same time to effect disengagement of a pair of movable contact members 322 and 324 from respectively associated pairs of insulated contact fingers 323 and 325. When the electromagnet 315 is deenergized, the contact members 316 and 318 are actuated out of engagement with their associated contact fingers and the contact members 322 and 324 are actuated into circuit-closing contact with their associated pairs of contact fingers, either by gravity or by other suitable biasing means, not shown.

The relay 31 is illustrated diagrammatically as comprising an electromagnet 328 having associated therewith a magnetic core in the usual manner and effective, when energized, to shift a movable contact member 329 into circuit-closing contact with a pair of insulated contact fingers 331. When the electromagnet 328 is deenergized, the contact member 329 is shifted out of engagement with the contact fingers 331 either by gravity or by some suitable biasing means, not shown.

It is believed unnecessary to describe the various electrical circuits and circuit connections at this time for the reason that they will be described in connection with an assumed operation of the equipment.

OPERATION

*Application of the brakes, including automatic regulation of rate of retardation*

Assuming that the car or train is traveling in a forward direction, that the coefficient of adhesion between the car wheels and the track rails is in excess of twenty-five per cent, that the main reservoir 11 is charged to full pressure in any suitable manner as from a fluid compressor, not shown, that the operating handle of the self-lapping brake valve device 14 is in release position, and that the equipment is otherwise conditioned as shown in Fig. 1, the operator may effect either a service or an emergency application of the brakes by shifting the operating handle 15 to service or emergency positions respectively. Assuming that the operator shifts the handle 15 to a service application position in the application zone, fluid under pressure is supplied from the main reservoir 11 under the control of the self-lapping valve device 14 to the straight-air pipe 13 and thence to the brake cylinder 12 by way of the branch pipe 159, supply passage 158 of the control valve mechanism 16, annular chamber 186, past the valve piston 181 which is shifted downwardly by the pressure of the fluid in the chamber 186, chamber 164 and pipe 165. The pressure developed in the brake cylinder 12 corresponds to the degree to which the operating handle 15 is shifted out of release position.

With the electromagnet 167 of the application magnet valve device 145 deenergized as shown, the pressure equalizing communication between the chamber 156 and the chamber 153 at opposite sides of the valve piston 151 of the application valve device 141 is open and consequently fluid pressure is supplied to both chambers 156 and 153 from the supply passage 158 so that the spring 154 maintains the valve piston 151 seated.

In a similar manner, since the electromagnet 211 of the slow release magnet valve device 147 is deenergized, the communication between the annular chamber 206 at one side of the slow release valve device 143 is connected to the chamber 203 at the opposite side of the valve piston and consequently fluid under pressure supplied to the chamber 206 from the chamber 164 through the passage 163 is also supplied to the chamber 203. In view of the fact that the pressures are built up substantially simultaneously in the chamber 206 and 203 at opposite sides of the valve piston 201, the spring 204 maintains the valve piston 201 seated.

Also in a similar manner, the valve piston 231 of the fast release valve device 144 is maintained in seated position due to the substantially simultaneous build-up of pressure in the chambers 236 and 233 at opposite sides of the valve piston, the electromagnet 243 of the fast release magnet valve device 148 being deenergized.

Fluid under pressure supplied to the chamber 164 and brake cylinder 12 also flows through the passages 163, 162 and 266 to the chamber 265 at the upper side of the diaphragm 259 of the interlock switch device 149. In view of the fact that the chamber 268 at the lower side of the diaphragm 259 is supplied with fluid under pressure directly from the passage 158 through the branch passage 269, there may be a slight differential in the pressure in the chamber 268 over that in the chamber 265 but insufficient to overcome the spring 260. In any case, even though the pressure in the chamber 268 is sufficiently higher, momentarily, than the pressure built up in the chamber 265, to cause the diaphragm 259 to be shifted upwardly so as to effect the circuit-closing engagement of the contact member 262 with the contact fingers 263 and 264, such operation of the interlock switch 149 is without effect at this time as will subsequently appear.

Whenever the pressure built up in the brake cylinder 12 and accordingly in the chamber 306 of the pneumatic switch device 27 exceeds the relatively low value of two or three pounds per square inch, the contact member 304 is shifted into contact with the contact fingers 305 to connect one terminal of the battery 22 to the contact segments 115 and 115a of the adhesion adapter devices 18 and 18a, respectively, through a circuit which extends from the one terminal of the battery through a wire 341, train wire 24, branch wire 342, contact fingers 305 and contact member 304 of pneumatic switch device 27, and wire 108.

Let it be assumed that the operator has operated the operating handle 15 of the self-lapping valve device 14 to cause a pressure to be built up in the brake cylinder 12 which applies the brake shoes to the car wheels of the wheel truck, with which the adhesion adapter devices 18 and 18a are associated, the degree of the braking force being such as to cause shifting of the fly-wheel 58 relative to the wheel 40 of the adapter device 18 to a sufficient degree that the brush 125 engages the inner end of the contact segment 117.

The engagement of the brush 125 with the contact segment 117, or the engagement of the brush 125a with the contact segment 117a, completes a circuit for energizing the electromagnet 275 of the direction-determining relay 19, this circuit extending from the terminal of the battery 22 (see Fig. 1) to the contact segments 115 and 115a as previously traced, and thence through the brush 124, connector 129, brush 125, contact segment 117, wire 106, a wire 344, contact fingers 292a and contact member 289a of the direction-determining relay 19a, a wire 345, contact fingers 291 and contact member 288 of the direction-determining relay 19, wires 346 and 347, electromagnet 275 and thence to the opposite terminal of the battery 22, as by connection to ground through a wire 348, the terminal of the battery 22 opposite to that to which the wire 341 is connected being grounded.

The connection through the adhesion adapter device 18a is in parallel with that established through the adhesion adapter device 18 and extends from the wire 108 through the branch wire 108a, contact segment 115a, brush 124a, connector 129a, brush 125a, contact segment 117a and branch wire 106a to the wire 106.

As previously stated, the contact member 281 of the direction-determining relay 19 is actuated into circuit-closing contact with the contact fingers 286 upon energization of the electromagnet 275 of the relay and, accordingly, a circuit is established for holding or maintaining the electromagnet 275 of the relay 19 energized independently of the connection through the adhesion adapter devices 18 and 18a, as long as the pneumatic switch device 27 is in circuit-closing position, this circuit extending from the non-grounded terminal of the battery 22 through pneumatic switch device 27 to the wire 108, as previously traced, thence by a branch wire 351, a wire 352, contact fingers 286 and contact member 281 of relay 19, wire 347, electromagnet 275, wire 348 and through ground to the opposite terminal of the battery 22.

When the contact member 276 of the relay 19 engages the associated contact fingers 282 in circuit-closing relation due to the energization of the electromagnet 275 of the relay 19, a circuit is completed for energizing the electromagnet 187 of the cut-off magnet valve device 146, this circuit extending from the non-grounded terminal of the battery 22 through the pneumatic switch device 27 and adhesion adapter devices 18 and 18a to the wire 106 as previously traced, thence by wire 344, contact fingers 282 and contact member 276 of relay 19, wires 354 and 355, electromagnet 187, a wire 356 to ground and thus to the grounded terminal of the battery 22.

Upon the energization of the electromagnet 187 of the cut-off magnet valve device 146, the venting communication for the chamber 183 at the lower side of the valve piston 181 of the cut-off valve device 142 is closed and fluid under pressure is supplied to the chamber 183 from the passage 158 in the manner previously described. Thereupon, the valve piston 181 of the cut-off magnet valve device 142 is shifted into seated relation on the annular rib seat 185 to cut off the further supply of fluid under pressure from the passage 158 to the brake cylinder 12.

In a similar manner the cut-off valve device 142 of other control valve mechanisms 16 associated with the brake cylinders on other wheel trucks throughout the length of the train are also operated to cut off the further supply of fluid under pressure to the associated brake cylinders.

As previously explained, the shifting of the brushes 124 to 127 on the fly-wheel 58 of the adhesion adapter device 18 out of the normal position thereof a sufficient degree to cause contact of the brush 125 with the contact segment 117 occurs only when the braking force applying the brake shoes to the car wheels is such as to produce a rate of retardation on the car wheels of at least 5.5 miles per hour per second. As previously pointed out also, heretofore known brake control equipment, of either the speed-governor or the inertia-governor type, is ineffective to regulate to such a high rate of retardation.

As is well known, the coefficient of friction between the brake shoes and the car wheels increases as the speed of the car or train decreases and, consequently, as the speed of the car or train reduces, the maintenance of the braking force corresponding to the attained brake cylinder pressure causes an increase in the rate of retardation on the car wheels, since the force of retardation acting on the car wheels increases in proportion to the product of the braking force and the coefficient of friction between the brake shoes and the car wheels. With the increase in the rate of retardation of the car wheels thus produced, the fly-wheel 58 of the adhesion adapter device 18 and in a similar manner, the fly-wheel 58a of the adhesion adapter device 18a are shifted or displaced to a further degree out of the normal or neutral position thereof to a sufficient degree to cause the brushes 126 and 126a thereof to engage the inner end of the contact segments 119 and 119a, respectively.

Such contact of the brush 126 with the contact segment 119, or the contact of the brush 126a with the contact segment 119a, completes a circuit for energizing the electromagnet 328 of the retardation control relay 31, this circuit extending from the non-grounded terminal of the battery 22 through the pneumatic switch device 27 to the brushes 124, 125 and 126 as previously described, thence through contact segment 119, wire 104, contact fingers 283 and contact member 277 of the relay 19, a wire 358, train wire 25, a branch wire 359, contact fingers 323 and contact member 322 of the control relay 29, a wire 361, electromagnet 328 of the relay 31 and to the grounded terminal of the battery 22, as by a wire 362 connected to ground.

Since the retardation control relays 31 for control valve mechanisms 16 (not shown) associated with other wheel trucks, are similarly connected to the train wire 25 it follows that they are also energized simultaneously with the energization of the relay 31 independently of whether or not the brush 126 or 126a of the adhesion adapter devices associated with such wheel trucks contact the segments 119 and 119a, respectively. It follows, therefore, that the control relays 31 for all the control valve mechanisms 16 are substantially simultaneously energized upon the first engagement of a brush 126 of any of the adhesion adapter devices with its associated contact segment 119.

The actuation of the contact member 329 of the relay 31 into circuit-closing relation with the contact finger 331, due to the energization of the electromagnet 328, completes a circuit for energizing the electromagnet 211 of the slow release magnet valve device 147, this circuit extending from the non-grounded terminal of the battery 22 through the train wire 24, pneumatic switch device 27, adhesion adapter devices 18 and 18a in parallel, to the wire 106 as previously traced, thence through the wire 344, contact fingers 282 and contact member 276 with the relay 19, wire 354, a branch wire 364, contact fingers 331 and contact member 329 of relay 31, a wire 365, electromagnet 211 of the slow release magnet valve device 147, and to the grounded terminal of the battery 22 as by connection to ground through a wire 366.

As previously pointed out, the engagement of the brush 126 with the contact segment 119, or of the brush 126a with the contact segment 119a, occurs only when the retardation force on the car wheels is such as to cause the rate of retardation on the car wheels to increase to, for example, 6.6 miles per hour per second.

Since the brushes, corresponding to the brushes 124 to 127 of the adhesion adapter device 18, of the adhesion adapter devices associated with all the wheel trucks have been shifted sufficiently that the brush corresponding to the brush 125 engages the segment corresponding to contact segment 117, it follows that the energization of the control relay 31 for each of the wheel trucks completes circuits corresponding to that just traced, for energizing the electromagnet of the slow release magnet valve device on the control valve mechanism for other wheel trucks corresponding to the control valve mechanism 16 and, accordingly, that the result produced is the same for all control valve mechanisms 16.

As previously indicated, the energization of the electromagnet 211 of the slow release magnet valve device 147 causes the pressure in the chamber 203 at the lower side of the valve piston 201 of the slow release valve device 143 to be vented to atmosphere and, consequently, the higher brake cylinder pressure existing in the annular chamber 206 at the opposite side of the valve piston 201 overcomes the spring 204 and shifts the valve piston 201 away from the annular rib seat 205, to open the communication for venting fluid under pressure from the brake cylinder to atmosphere through the pipe 165, chamber 164, passage 163, annular chamber 206 past the unseated valve piston 201, passage 207, and restricted port 209 in the choke fitting 208.

Reduction in the pressure in the brake cylinder 12, and in all of the brake cylinders associated with other wheel trucks is thus effected at a rate determined by the size of the restricted port 209. The rate of reduction in brake cylinder pressure through the port 209 is such that the respective fly-wheels 58 of the adhesion adapter devices 18 and 18a recede gradually toward their normal or neutral positions sufficiently that the brush 126 disengages contact segment 119 and the brush 126a disengages the contact segment 119a. The rate of reduction in brake cylinder pressure through the port 209 is not, however, rapid enough to produce recession of the fly-wheel 58 toward its normal or neutral position to a sufficient degree to effect the disengagement of the brush 125 from the contact segment 117 or the disengagement of the brush 125a from the contact segment 117a.

It will be apparent, therefore, that as a result of the final disengagement of all the brushes 126 and 126a of all the adhesion adapter devices for all wheel trucks from the contact segments 119 and 119a, respectively, the circuit for energizing the relay 31 for each wheel truck is interrupted and, consequently, the circuit established by each of the relays 31 for energizing a corresponding slow release magnet valve device 147 is interrupted. As a result, the valve piston 201 of the slow release valve device 143 is again seated on the annular rib seat 205 to prevent further reduction in brake cylinder pressure through the port 209. In view of the fact that the brushes 125 and 125a remain in engagement with the contact segments 117 and 117a, respectively, the circuit previously traced for energizing the cut-off magnet valve device 146 is not interrupted and, consequently, the valve piston 181 of the cut-off valve device 142 remains seated to prevent any increase or build-up in brake cylinder pressure by flow of fluid under pressure there-past from the passage 158 in which, it will be understood, the original pressure established by operation of the operating handle 15 of the self-lapping valve device 14 remains.

As the speed of the car or train reduces further, the increase in the coefficient of friction between the brake shoes and car wheels may again produce such an increase in the rate of retardation on the car wheels as to effect re-engagement of the brushes 126 and 126a with the contact segments 119 and 119a of the adhesion adapter devices 18 and 18a, respectively. In such case, the operation just described is repeated and the pressure in the brake cylinder 12 and in the brake cylinders associated with other wheel trucks further reduces. It will thus be apparent that the adhesion adapter devices 18 and 18a function automatically to regulate the rate of retardation produced on the car or train to a substantially constant rate, in a manner similar to inertia-governor devices of brake control equipments heretofore known except that the rate of retardation is higher than the rate of retardation effected by heretofore known devices and equipments.

In the foregoing operation, it was assumed that the coefficient of adhesion between the car wheels and the track rails was twenty-five per cent or over and that the braking ratio, that is, the ratio of the total braking force acting on the wheels of a wheel-truck with respect to the total load or force pressing the wheels of the wheel-truck to the rails is such that the braking forces which produce a rate of retardation on the car wheels of 6.6 miles per hour per second are insufficient to overcome the force of adhesion between the car wheels and the track rails. If, therefore, the actual coefficient of adhesion between the car wheels and the track rails is in excess of twenty-five per cent practically seventy-five per cent of the time the train is in service, it will be seen that notwithstanding the retardation of the car wheels at a rate up to 6.6 miles per hour per second, no sliding of the car wheels will occur the majority of the time. In view of the fact that the brake control equipment comprising my invention regulates the rate of retardation of the train automatically to a substantially constant rate higher than that to which heretofore known devices and equipments have attained, it will be seen that a car or train provided with my brake control equipment may be brought to a stop from a given high speed in a much shorter distance than has heretofore been possible.

When the car or train is brought to a complete stop, the brushes 124 to 127 and 124a to 127a of the adhesion adapter devices 18 and 18a, respectively, return to the normal or the neutral position thereof. Upon the disengagement of the brushes 125 and 125a from the contact segments 117 and 117a respectively, the circuit for energizing the electromagnet 187 of the cut off magnet valve device 146 is interrupted and the electromagnet consequently deenergized. As a result, the pressure established in the straight-air pipe 13, in the supply passage 158, and in the annular chamber 186 of the control valve mechanism 16, as well as the brake cylinder pressure in the chamber 164 unseats the valve piston 181 of the cut-off valve device 142. Fluid under pressure is accordingly again supplied from the straight-air pipe 13 to the brake cylinder to build up the pressure in the brake cylinder substantially to the pressure established originally in the straight-air pipe. Thus, although the brake cylinder pressure is reduced, as previously described, by operation of the control valve mechanism to maintain a substantially constant rate of retardation of the vehicle, adequate braking force is automatically restored when the train is completely stopped in order to insure against undesired creepage or movement of the train. This feature of the invention whereby full braking force is automatically restored is particularly advantageous in cases where the train stops on a grade.

It will be apparent that, with the brushes of the adhesion adapter devices in the neutral position thereof, the brake cylinder pressure may be increased as desired up to the maximum possible degree by operation of the self-lapping valve device 14, because the cut-off valve device 142 will admit fluid under pressure to the brake cylinder to substantially whatever degree is established in the straight-air pipe 13.

Release of the brakes

After the car or train has been brought to a complete stop, and it is desired to again start the car or train under power, the brakes may be released by returning the operating handle 15 of the self-lapping valve device 14 to release position wherein the self-lapping valve device 14 functions in well known manner to vent fluid under pressure from the straight-air pipe and accordingly reduce the pressure therein to atmospheric pressure. As will be seen in Fig. 5, the reduction of pressure in the straight-air pipe 13 produces a corresponding reduction of the pressure in the supply passage 158 of the control valve mechanism 16 and when the pressure in the passage 158 reduces below the pressure in the brake cylinder 12 and consequently in the passage 162, the higher pressure unseats the check valve 271 and fluid under pressure is thus released from the brake cylinder 12 by flow from the passage 162 through the passage 272, past the check valve 271, and through passage 158, pipe 159, straight-air pipe 13 and to atmosphere under the control of the self-lapping valve device 14. Thus, the pressure in the brake cylinder 12 may be reduced to completely release the brakes, independently of either the slow release valve device 143 or the fast release valve device 144 by merely returning the operating handle of the self-lapping valve device 14 to release position.

When the car or train is stopped and the brushes of the adhesion adapter devices 18 and 18a are in neutral position, fluid under pressure may also be released from the brake cylinder 12 past the cut-off valve device 142 as well as past the check valve 271, because the pressure acting in chamber 164 on the inner seated area of the valve piston 181 and in chamber 186 at the outer seated area of the valve piston is effective to overcome the spring 184 and unseat the valve piston 181 to permit release flow of fluid under pressure therepast in by-passing relation to the check valve 271.

It will be apparent that a graduated release of the brakes may be effected at any time by operating the self-lapping valve device 14 to reduce the pressure in the straight-air pipe 13 and thus in the brake cylinder 12 in a series of successive steps.

Anti-wheel-sliding operation

In the foregoing hypothetical operation, it was assumed that the coefficient of adhesion between the car wheels and the track rails was high enough so that the braking forces effective were insufficient to cause wheel slipping or wheel sliding. Let it now be assumed that, due to moisture, frost or other agents on the rails or wheels, the coefficient of adhesion between the car wheels and the track rails is reduced to, for example, fifteen per cent. Thus, upon an application of the brakes initiated in the manner previously described, the braking force applying the brake shoes to the car wheels will be such as to cause the car wheels on the axle 36 associated with the adhesion adapter device 18 to begin to slip, that is, reduce from the speed of rotation corresponding to the speed of travel of the train toward zero speed corresponding to the locked condition of the car wheels. In a very short interval of time following the instant that the car wheels begin to slip, relative movement between the wheel 40 and fly-wheel 58 will take place and cause shifting of the brush 125 on the fly-wheel 58 into contact with the contact segment 117 and, consequently, in the manner previously described the electro-magnet 187 of the cut-off magnet valve device 146 is energized and prevents the further supply of fluid under pressure to the brake cylinder. It has been found that when the braking force applying the brake shoes to the car wheels exceeds, by only a slight amount, that braking force which will initiate slipping of the wheels, the slipping time, that is, the interval of time required for the car wheels to decelerate from a speed corresponding to the speed of travel of the train to zero speed corresponding to the locked condition of the wheel is appreciably longer than if the braking force were considerably in excess of the minimum amount which will initiate or produce slipping of the wheels. Consequently, by providing suitable relays 19 and 19a which respond quickly to the energization of the electromagnets thereof and thus cause an immediate cutting off of the flow of fluid under pressure to the brake cylinder, the slipping time for the car wheels is lengthened as much as possible, thereby enabling the subsequent reduction in brake cylinder pressure, as effected in the manner to be presently described, to take place rapidly enough so as to prevent the car wheels from decelerating to zero speed and thus to a locked condition. Accordingly, in the operation of my invention a slipping time of from three-quarters of a second to one second may be dependably realized.

Once the car wheels associated with the axle 36 of the adhesion adapter device 18 begin to slip, the rate of retardation in the rotative speed of the car wheel increases rapidly so that the flywheel 58 is rapidly shifted relative to the wheel 40 to such a degree that the brush 127 engages the inner end of the contact segment 121, the interval of time over which the increase in the rate of retardation in the rotative speed of the car wheels takes place being only a fraction of a second.

It is assumed for the moment that only the car wheels on the axle 36 associated with the adhesion adapter device 18 begin to slip but it will be understood that, in the event the car wheels on the axle associated with the adhesion adapter device 18a also begin to slip, the brush 127a of the adhesion adapter device 18a will be rapidly shifted into contact with the contact segments 121a as in the case of the adhesion adapter device 18. It will be understood that the brake cylinder 12 or a plurality of parallel connected brake cylinders acting in the place of the brake cylinder 12 are effective to apply the brakes only on the car wheels of the axles associated with the adhesion adapter devices 18 and 18a. It will thus be clearly seen that whether the adhesion adapter devices 18 and 18a are separately actuated, as just described, or whether both the adapter devices 18 and 18a are simultaneously actuated, the effect will be the same.

Upon the engagement of the brush 127 of the adhesion adapter device 18 with the segment 121, a circuit is completed for energizing the electromagnet 315 of the wheel-slip control relay 29 and also the electromagnet 243 of the fast release magnet valve device 148. This circuit extends from the nongrounded terminal of the battery 22 through the train wire 24 and pneumatic switch device 27 to the brushes 124 to 127, in the manner previously traced, and thence through the contact segment 121, wire 102, a wire 375, contact fingers 284 and contact member 278 of the relay 19, and a wire 376 to the point 377 whence the circuit divides into two branches, the one branch extending by way of a wire 378, contact fingers 325 and contact member 324 of the control relay 29, wires 379 and 381, electromagnet 315 of the relay 29, wire 382 to ground and, through ground, back to the grounded terminal of the battery 22. The other branch of the circuit extends from the point 377 through the wire 378, electromagnet 243 of the fast release magnet valve device 148, wire 383 to ground and thence, through ground, to the grounded terminal of the battery 22.

The magnet valve device 148 responds very rapidly and causes venting of the chamber 233 at the lower side of the valve piston 231 of the fast release magnet valve device 144, and the higher brake cylinder pressure effective in the annular chamber 236 at the outer seated area of the valve piston 231 accordingly unseats the valve piston 231 against the force of the spring 234 and thus reduces brake cylinder pressure by flow past the valve piston 231 through the passage 238 and port 241 in the choke fitting 239, which port is quite appreciably larger than the slow release port 209, as before described, and, therefore, permits a more rapid flow to the atmosphere.

At the same time, the energization of the electromagnet 315 of the control relay 29 causes engagement of the contact member 318 with the contact fingers 319. A holding circuit is thus established for maintaining the relay 29 energized independently of whether the brush 127 subsequently recedes out of contact with the segment 121 toward its normal or neutral position. This holding circuit extends from the battery 22 through the train wire 24, pneumatic switch device 27, brush 125 and contact segment 117 of the adhesion adapter device 18, in the manner previously described, and thence through the wire 106, wire 344, contact fingers 282 and contact member 276 of the relay 19, wires 354 and 355, contact fingers 319 and contact member 318 of the relay 29, wire 381, electromagnet 315 of the relay 29, wire 382 to ground, and thence to the grounded terminal of the battery 22 through ground.

At the same time, the contact member 322 of the relay 29 disengages the contact fingers 323 to interrupt the previously traced circuit for energizing the electromagnet 328 of the relay 31, which circuit was established in the manner previously described, upon contact of the brush 126 with the contact segment 119 of the adhesion adapter device 18. Consequently, although the circuit for energizing the slow release magnet valve device 147 may be momentarily completed by the momentary energization of the relay 31, such energization is only momentary for the reason that the relay 29, when energized, immediately causes deenergization of the relay 31 and consequently the deenergization of the slow release magnet valve device 147.

In view of the fact that the chamber 265 at the upper side of the diaphragm 259 of the interlock switch device 149 is constantly connected to the brake cylinder passage 162, the reduction in brake cylinder pressure effected by the fast release valve device 144 effects a similar reduction in the pressure in the chamber 265. Consequently, when the pressure in the chamber 268 at the lower side of the diaphragm 259, which pressure corresponds to the pressure in the supply passage 158 and which is maintained, exceeds the pressure in the chamber 265 by a sufficient amount to overcome the tension of the spring 260, the diaphragm 259 is flexed upwardly to effect engagement of the contact member 262 with the contact fingers 263 and 264 and thereby establish an additional holding circuit for maintaining the electromagnet 315 of the relay 29 energized, notwithstanding that the brush 125 of the adhesion adapter device 18 may recede out of contact with the contact segment 117 toward the normal neutral position thereof. This holding circuit extends from the non-grounded terminal of the battery 22 through wire 341, contact finger 263 of the interlock switch 149, contact member 262, contact finger 264, a wire 385, contact fingers 317 and contact member 316 of the relay 29, a wire 386, wire 381, electromagnet 315 of relay 29, wire 382 to ground and thence to the grounded terminal of the battery 22 through ground. At the same time also, engagement of the contact member 262 of the interlock switch 149 with the contact fingers 263 and 264 completes a holding circuit for maintaining energized the electromagnet 187 of the cut-off magnet valve device 146, independently of the recession of the brush 125 out of contact with the contact segment 117 of adhesion adapter device 18 toward its normal neutral position. This holding circuit extends from the battery 22 through the interlock switch 149 and contact fingers 317 and contact member 316 of the relay 29 to the wire 381, in the manner previously traced, and thence by way of contact fingers 319 and contact member 318 of the relay 29, wire 355, electromagnet 187, wire 356 to ground, and thence to the grounded terminal of the battery 22 through ground.

The size of the port 241 in the choke fitting 239 of the fast release magnet valve device 144 is such that the pressure in the brake cylinder 12 is reduced rapidly enough, upon the unseating of the valve piston 231, that in a fraction of the total slipping time, the brake cylinder pressure and accordingly the retardation force on the car wheels which began to slip is reduced sufficiently that the rate of retardation is reduced to zero after which the wheels accelerate rapidly back toward a rotation speed corresponding to the speed of the car or train.

The car wheels accelerate rotatively at a rate which is much more rapid than the rate of rotative retardation incident to slipping, in view of the relatively light weight or mass of an individual car wheel, or a wheel-and-axle unit relative to the total weight of the car or train. In view of the rapid rate of acceleration of the car wheels, the total period of time over which the acceleration occurs is less than the interval of time over which retardation occurred and during which the fast release valve device 144 was effective to release fluid under pressure from the brake cylinder. It will be apparent that, when the rate of retardation of the car wheels which began to slip is reduced sufficiently to cause the fly-wheel 58 to recede back toward its normal or neutral position and thereby effect disengagement of the brush 127 from the contact member 121, the circuit for energizing the electromagnet 243 of the fast release magnet valve device 148 is interrupted and, consequently, the fast release valve device 144 is immediately and rapidly actuated to close off communication through which fluid under pressure flows to atmosphere through the port 241 of the choke fitting 239.

Since the car wheels associated with the axle 36 of the adhesion adapter device 18 accelerate at an exceedingly rapid rate, the fly-wheel 58 tends to lag behind the wheel 40 and, consequently, the brushes 124 to 127 are shifted in the right-hand direction, as viewed in Fig. 1, so as to effect engagement of the brushes 125, 126 and 127 with the contact segments 116, 118 and 120, respectively.

The contact segment 116 is connected by the wire 107 and a wire 388 to one of the contact fingers 292 of the relay 19 and one of the contact members 282a of the relay 19a. With the relay 19 maintained energized, however, through the holding circuit previously traced, the contact member 289 thereof is disengaged from the contact fingers 292. Also, since the relay 19a is deenergized, the contact member 276a is disengaged from the contact fingers 282a. Consequently, the contact segment 116 of the adhesion adapter device is electrically isolated and the engagement of the brush 125 therewith is without effect.

The contact segment 118 of the adhesion adapter device 18 is connected by the wire 105 to one of the contact fingers 283a of the relay 19a, but with the relay 19a deenergized the contact member 277a is disengaged from the contact fingers 283a. Accordingly, the contact segment 118 is also isolated electrically and the engagement of the brush 126 therewith is without effect.

The engagement of the brush 127 with the contact segment 120, however, completes a circuit for energizing the electromagnet 167 of the application valve device 145, this circuit extending from the battery 22 to the brush 127 in the manner previously described, thence through contact segment 120, wire 103, a wire 391, contact fingers 285 and contact member 279 of the relay 19, a wire 392, electromagnet 167 of the magnet valve device 145, a wire 393 to ground, and thence to the grounded terminal of the battery 22 through ground.

Energization of the magnet valve device 145 thus causes the chamber 153 at the lower side of the valve piston 151 of the application valve device 141 to be vented to atmosphere. Consequently, the valve piston 151 is unseated by the higher pressure in the annular chamber 156 as supplied from the supply passage 158. Fluid under pressure is accordingly supplied from the supply passage 158 to the brake cylinder 12 through the passage 157, annular chamber 156, past the unseated valve piston 151, passage 161, port 169a in choke fitting 160, passage 162, 163, chamber 164, and pipe 165. The port 169a in the choke fitting 160 is of any suitable size and may be of such size that fluid under pressure is supplied to the brake cylinder therethrough at substantially the same rate as it was vented from the brake cylinder through the port 241 of the choke fitting 239.

As the rate of acceleration of the wheels which began to slip, decreases, that is, as the rotative speed of the wheels approaches the speed corresponding to the speed of travel of the car or train, the lagging effect of the fly-wheel 58 becomes less pronounced and consequently the brushes 124 to 127 recede back toward the normal or neutral position thereof so that disengagement of the brushes 127, 126 and 125 from the contact segments 120, 118 and 116, respectively, is effected.

Disengagement of the brush 127 from the contact segment 121 interrupts the circuit for energizing the electromagnet 167 of the application magnet valve device 145. Consequently, equalization of the pressure in the chambers 156 and 153 at opposite sides of the valve piston 151 of the application valve device 141 is restored and the application valve piston 151 is reseated to close off the further supply of fluid under pressure from the passage 158 therepast to the brake cylinder.

In view of the fact, however, that the time required for the wheels which began to slip to accelerate back to a speed of rotation corresponding to the speed of travel of the car or train is shorter than the time over which fluid under pressure was released from the brake cylinder through port 241, it will be seen that the degree to which the pressure of the brake cylinder is rebuilt by unseating of the valve piston 151 of the application valve device 141 will be lower than the pressure to which it was originally built up and which initiated the slipping of the wheels.

As previously explained, the cut-off valve device 142 is operated very rapidly to cut off the supply of fluid under pressure to the brake cylinder following the engagement of the brush 125 with the contact segment 117 of the adhesion adapter device 18, and thus prevents the brake cylinder pressure from attaining a value much higher than the minimum pressure which will produce or cause slipping of the wheels. Therefore, since the pressure which is reestablished in the brake cylinder pressure by operation of the application valve device 141 will be appreciably less, it follows that the likelihood of the reestablished pressure causing the wheels to slip is unlikely.

It will be observed that the operation of the adhesion adapter devices 18 and 18a in preventing sliding of the car wheels on the axles with which they are associated is entirely local and without effect as respects the control of brake cylinder pressure to prevent sliding of the wheels on other wheel trucks. Therefore, on those wheel trucks where there is no tendency for the wheels to slip or slide, the adhesion adapter devices 18 and 18a function in the manner previously described to regulate the rate of retardation of the wheels for the individual trucks to the particular rate for which the adhesion adapters are designed.

The reason for and the function of the interlock switch 149 should now be apparent, for in the shifting of the brushes from the retardation contact segments 121, 119, and 117 on one side of the neutral position thereof to the acceleration contact segments 120, 118 and 116 on the opposite side of the neutral position thereof, the brush 125 completely disengages the contact segment 117 and would thereby interrupt the circuit for energizing the electromagnet of the cut-off magnet valve device 146 unless the circuit were otherwise maintained. However, in order to limit the resupply or readmission of fluid under pressure to the brake cylinder to the control of the application valve device 141, it is necessary that the cut-off valve device 142 remain closed.

In view of the fact that the brake cylinder pressure and consequently the pressure in the chamber 265 at the upper side of the diaphragm 259 of the interlock switch 149 is not restored to the pressure in the straight-air pipe 13 and that in chamber 268 at the lower side of the diaphragm 259, the interlock switch contact 262 remains in engagement with the contact fingers 263 and 264 and, accordingly, maintains the holding circuit for both the relay 29 and the electromagnet of the cut-off magnet valve device 146, unless and until the self-lapping valve device 14 is operated to reduce the pressure in the passage 158 and in the chamber 268 substantially to the pressure in the chamber 265 of the interlock switch device 149.

Thus, notwithstanding that under wheel-slipping conditions the control of brake cylinder pressure is taken automatically out of the hands of the operator, the operator may retain a certain amount of control over the brake cylinder pressure by reason of his ability to reduce pressure in the straight-air pipe 13 by operation of the self-lapping brake valve device 14.

If, therefore, following the operation of the equipment in the manner just described to partially restore the pressure in the brake cylinder, the operator operates the self-lapping valve device 14 to reduce the pressure in the straight-air pipe supply passage 158 and chamber 268 at the lower side of the diaphragm 259 of the interlock switch device 149 to a pressure substantially equal to that restored in the brake cylinder and, accordingly, in the chamber 265 at the upper side of the diaphragm 259, the spring 260 becomes effective to shift the diaphragm 259 downwardly and thus causes separation of the contact member 262 from the contact fingers 263 and 264. The holding circuit for maintaining energized the electromagnet of the cut-off magnet valve device 146 and the electromagnet 315 of the relay 29 is accordingly interrupted and the magnet valve device and electromagnet deenergized. With the re-engagement of the contact member 322 of the relay 29 with the contact fingers 323, the electromagnet 328 of the relay 31 is reconnected to the train wire 25. Thereafter, the adhesion adapter devices 18 and 18a control the operation of the cut-off magnet valve device 146 and the slow release magnet valve device 147 in the manner previously described to regulate the rate of retardation for the car wheels associated therewith to a substantially constant rate.

It will be apparent that unless the operator does reduce the pressure in the straight-air pipe to cause opening of the interlock switch device 149, the adhesion adapter devices are ineffective after the wheel slipping condition is relieved, to control the slow release valve device 143 in the manner previously described, to release fluid under pressure from the brake cylinder, for the reason that the circuit for energizing the retardation relay 31 is held open by the wheel slip relay 29. However, in the event that the reduced brake cylinder pressure is sufficient to again initiate slipping of the wheels at a lower speed, the adhesion adapters again function to prevent sliding of the wheels.

In the same manner as previously described for application of the brakes without wheel-slipping, the brushes 124 to 127 and 124a to 127a of the adhesion adapter devices 18 and 18a, respectively, return to their normal or neutral positions upon the train being brought to a complete stop. Assuming that the operator has previously reduced the pressure in the straight-air pipe 13 sufficiently to cause opening of the interlock switch device 149, the cut-off magnet valve device 146 is accordingly deenergized and, consequently, the valve piston 181 of the cut-off valve device 142 is unseated so that the pressure in the brake cylinder and in the straight-air pipe 18 becomes substantially equalized.

If the operator does not reduce the pressure in the straight-air pipe following the occurrence of wheel-slipping, and the interlock switch device 149 remains in closed position at the time that the train is brought to a complete stop, then the holding circuit for maintaining the electromagnet of the cut-off magnet valve device 146 energized is maintained and, consequently, the valve piston 181 of the cut-off valve device 142 will not be unseated. Thus, the pressure in the brake cylinder associated with the control valve mechanism 16 and adhesion adapter devices for the wheels which slipped is not restored automatically to the original pressure established in the straight-air pipe.

After the train has been brought to a complete stop, however, the operator may safely reduce the pressure in the brake cylinder in the straight-air pipe sufficiently to cause opening of the interlock switch device 149 and the consequent deenergization of the electromagnet of the cut-off magnet valve device 146. Thereafter, the valve piston 181 of the cut-off valve device 142 will unseat to permit fluid under pressure to be supplied from the supply passage 153 to the brake cylinder upon an increase in the pressure in the straight-air pipe.

*Adaptability of the adhesion adapter devices for either forward or backward direction of travel*

In the foregoing operation described, it was assumed that the car or train was traveling in a forward direction and, therefore, that the brushes 124 to 127 on the fly-wheel 58 of the adhesion adapter 18 and the brushes 124a to 127a on the adhesion adapter 18a shifted in the left-hand direction from the position shown in Fig. 1 upon the application of the brakes, and that following slipping of the wheels, the brushes 124 to 127 were shifted to the right-hand direction from the neutral position shown in Fig. 1. Let it now be assumed that the car or train of cars is traveling in a backward direction. Obviously, upon the application of the brakes being effected, the brushes 124 to 127 and 124a to 127a will shift in the right-hand direction from the neutral position shown in Fig. 1. When the fly-wheel 58 has shifted a sufficient degree out of the neutral position in a right-hand direction relative to the wheel 40, as indicated in Fig. 1, the brush 125 engages the contact segment 116, and thereby completes a circuit for energizing the electromagnet 275a of the relay 19a. This circuit extends from the battery 22 through the train wire 24, pneumatic switch device 27 to the brush 125 as previously described, and thence by way of the contact segment 116, wires 107 and 388, contact fingers 292 and contact member 289 of the relay 19, a wire 401, contact fingers 291a and contact member 288a of the relay 19a, wires 400 and 402, electromagnet 275a, a wire 403 to ground, and thence through ground back to the grounded terminal of the battery 22.

In a manner similar to that described for the relay 19, a holding circuit for maintaining the electromagnet 275a energized is established upon the engagement of the contact member 281a of the relay 19a with the contact fingers 286a, this holding circuit extending from the battery 22 through the train wire 24, pneumatic switch device 27, wires 108 and 351 to the wire 352, and thence through the contact fingers 286a and contact member 281a of the relay 19a, wire 402, electromagnet 275a, wire 403, and through ground back to the battery 22. The disengagement of the contact member 289a from the contact fingers 292a of the relay 19a interrupts the circuit, previously traced, through which the electromagnet 275 of the relay 19 may be initially energized by contact of the brush 125 with the contact segment 117 and, consequently, as long as the pneumatic switch device 27 remains in closed position, the relay 19 cannot thereafter be energized by contact of the brush 125 with the contact segment 117.

Contact segment 116 is connected by the wires 107 and 388 to one of the contact fingers 282a of the relay 19a, the other of the contact fingers 282a being connected by wire 405 to the wire 354 at the point 406. Thus, the engagement of the contact member 276a of the relay 19a with the contact fingers 282a, as a result of the energization of the electromagnet 275a, completes a circuit for energizing the electromagnet 187 of the cut-off magnet valve device 146, this circuit extending from the battery 22 to the brush 125 as previously described, thence by way of the contact segment 116, wires 107 and 388, contact fingers 282a and contact member 276a of the relay 19a, wires 405, 354 and 355, electromagnet 187, wire 356, and through ground back to the grounded terminal of the battery 22.

The result is the same as that previously described for the engagement of the brush 125 with the contact segment 117, namely, the seating of the valve piston 181 of the cut-off valve device 142 to prevent the further supply of fluid under pressure to the brake cylinder 12.

When, due to the reduction in the speed of travel of the car or train, the rate of retardation of the car wheels increases to such an extent that the brush 126 on the fly-wheel 58 engages the contact segment 118, and assuming that the contact of brush 126 with segment 118 precedes the engagement of a corresponding brush with corresponding segment of any other adhesion adapted device, a circuit is completed for energizing the electromagnet 328 of the control relay 31 shown, as well as of the control relays 31 for other wheel trucks. This circuit extends from the battery, through the train wire 24 and pneumatic switch device 27 to the brush 126, in the manner previously described, thence by way of the contact segment 118, wire 105, contact fingers 283a and contact member 277a of the relay 19a, a wire 407, train wire 25, branch wire 359, contact fingers 323 and contact member 322 of the relay 29, wire 361, electromagnet 328 of the relay 31, wire 362, and through ground to the grounded terminal of the battery 22.

It will thus be seen that, as in the case of the forward direction of travel, the adhesion adapter device 18 and in a similar manner the adhesion adapter device 18a, function automatically for a backward direction of travel to regulate the rate of retardation of the car or train to a substantially constant rate of retardation, where the coefficient of adhesion between the car wheels and the track rails is sufficiently high that no slipping or sliding of the car wheels will result from the retardation of the car wheels at the regulated rate.

In the event that the coefficient of adhesion between the car wheels and the track rails happens to be or becomes a relatively low degree so that, upon the application of the brakes to a sufficient degree, the car wheels begin to slip, the brush 127 on the fly-wheel 58 then moves sufficiently in the right-hand direction from the neutral position shown in Fig. 1, to engage contact segment 120. A circuit is thereby completed for energizing the wheel-slip control relay 29, the circuit being identical with that described for the forward direction of travel from the battery 22 to the brush 127, thence by way of the contact segment 120, wires 103 and 391, contact fingers 284a and contact member 278a of the relay 19a, a wire 408 to the point 409 where it joins to the wire 376, the circuit thereupon being the same as previously described for the forward direction of travel, that is, dividing into two parallel branches, the one branch including the electromagnet 315 of the relay 29 and the other including the electromagnet 243 of the fast release magnet valve device 148.

The operation of the apparatus is thus the same as previously described in the case of wheel-slipping occurring upon the application of the brakes at the time the train is traveling in a forward direction.

When due to the release of fluid under pressure from the brake cylinder 12, the brushes 124 to 127 on the fly-wheel 58 shift back to the neutral position and into contact with the contact segments 117, 119 and 121, the effect is the same as for engagement of the brushes 124 to 127 with contact segments 116, 118, and 121, in the previously described operation for the forward direction of travel. The contact members 117 and 119 being connected to one of the pairs of contact members 282 and 283 respectively of the relay 19 are electrically isolated and consequently the engagement of the brushes 125 and 126 with the contact segments 117 and 119 is without effect.

The engagement of the brush 127 with the contact segment 121, however, completes a circuit for energizing the electromagnet 167 of the application magnet valve device 145, this circuit being identical with that in the case of the forward travel of the car or train from the battery 22 to the brush 127 and thence by way of the contact segment 121, wires 102 and 375, contact fingers 285a and contact member 279a of the relay 19a, a wire 411 which is connected to the wire 392 at the point 412, and thence through the wire 392, electromagnet 167, wire 393, and through ground to the grounded terminal of the battery 22.

The subsequent recession of the brushes 124 to 127 toward the neutral position thereof, as in the previously described instance, is effective to deenergize the electromagnet 167 of the application magnet valve device 145 and thus cause the application valve device 141 to reclose to cut off the further supply of fluid under pressure to the brake cylinder 12.

Being connected in parallel with the adhesion adapted device 18, the adhesion adapter device 18a functions in identically the same manner and to the same effect for the backward travel of the train or car to regulate the rate of retardation during an application of the brakes to a substantially constant rate and, in the event of the initiation of wheel slipping, to prevent the actual sliding of the wheels on the axle with which it is associated.

*Embodiment shown in Fig. 6*

Referring to Fig. 6, the equipment shown therein is a so-called single-end equipment, that is, an equipment adapted to function for travel of the car or train only in a forward direction.

The equipment shown in Fig. 6 is identical in many respects to the equipment shown in Fig. 1 as previously described. Accordingly the description of the equipment in Fig. 6 will be limited only to those respects in which there are differences as compared to the equipment in Fig. 1.

The adhesion adapter device in the equipment of Fig. 6 is designated 18b and is substantially identical in construction with that of the adapter device 18 as shown in Figs. 2 and 3, the parts in the device 18b being designated by the same reference numerals as in the device 18 except for the addition of the suffix "b".

In view of the fact that the equipment is intended to operate only for the forward travel of the car or train, the wheel of the adhesion adapter device 18b corresponding to wheel 40 of adapter device 18 is provided with retardation contact segments 117b, 119b, 121b, corresponding to the segments 117, 119 and 121 of the adhesion adapter device 18, a contact segment 115b corresponding to the contact segment 115 of the adhesion adapter device 18, and an acceleration contact segment 120b corresponding to the contact segment 120 of the adhesion adapter device 18. As previously explained, the contact segments 116 and 118 of the adhesion adapter device 18 shown in Fig. 1 serve no purpose as acceleration contact segments for the forward travel of the car or train, and consequently contact segments corresponding to the contact segments 116 and 118 have been omitted from adhesion adapter device 18b. As a result, collector rings corresponding to the collector rings 87 and 85, and brushes corresponding to brushes 97 and 95, of the adhesion adapter device 18 may be omitted from the adhesion adapter device 18b for further economy. It will be understood, however, that a standard design of adhesion adapter device, corresponding in construction to that shown in Fig. 4 may be provided if desired. In such case no electrical connections need be made to and through the contact segments corresponding to the contact segments 116 and 118.

It will be apparent also, in view of the fact that the equipment in Fig. 6 is adapted for travel of the car or train in a forward direction only, that there is no necessity for relays corresponding to the direction-determining relays 19 and 19a. The electrical circuits and connections are thus greatly simplified.

Contact segment 117b of the adhesion adapter device 18b is accordingly directly connected to the electromagnet 187 of the cut-off magnet valve device 146 through wires 106 and 355. Contact segment 119b is connected directly to the train wire 25 by the wire 104. Contact segment 121b is connected directly to the electromagnet 243 of the fast release magnet valve device 148 by wires 102 and 378. The contact segment 120b is connected directly to the electromagnet 167 of the application magnet valve device 145 by the wire 103.

The relays 29 and 31 are connected in the same manner as described in Fig. 1.

In operation, the equipment shown in Fig. 6 functions in exactly the manner previously described for a forward travel of the train in the double-end equipment shown in Fig. 1 and it is, therefore, deemed unnecessary to repeat a description of such operation in detail herein.

*Embodiment shown in Fig. 7*

The equipment illustrated diagrammatically in Fig. 7 is a single-end equipment which differs structurally from the equipment shown in Fig. 6 in certain respects to be hereinafter pointed out but which is adapted to produce the same results as the equipment shown in Fig. 6.

The equipment shown in Fig. 7 includes a control valve mechanism 16, an adhesion adapter device 18b, a pneumatic switch device 27 and a wheel-slip control relay 29 identical in construction to the corresponding devices shown and described in Fig. 6.

In order to illustrate the adaptation of my invention to various types of fluid pressure brake systems, the equipment shown in Fig. 7 does not include the straight-air system including the self-lapping valve device 14 and straight-air pipe 13 illustrated in Figs. 1 and 6, but includes in place thereof, an automatic system including a brake pipe 501 and a triple valve device 502 of well known construction. The triple valve is operated in well known manner by a reduction in the pressure of the fluid in the brake pipe 501 to supply fluid under pressure from an auxiliary reservoir 503 to the brake cylinder 12 by way of the pipe 159 and control valve mechanism 16.

In view of the fact that present day railroad trains are in most instances provided with a signal pipe which extends throughout the length of the train, the equipment shown in Fig. 7 includes the usual signal pipe, designated as signal pipe 505, for brake control communications between cars of the train, the necessity for the train wire 25, which is included in the embodiments shown in Figs. 1 and 6, being thereby obviated.

For simplicity a single battery 22, to one terminal of which the train wire 24 is connected, is provided as in the case of the embodiments shown in Figs. 1 and 6. However, train wire 24 may be dispensed with and the electrical connection provided thereby between cars obviated by providing separate batteries, corresponding to the battery 22, on each car of the train. Thus, in converting present day equipment in accordance with the embodiment of my invention shown in Fig. 7, no electrical connection between successive cars for brake control purposes need be required.

The embodiment shown in Fig. 7 further includes a valve mechanism 506, a so-called release reservoir 507 and a one-way or non-return valve 508, which, with the signal pipe 505, are so arranged and connected as to perform the necessary brake control operations in the manner to be hereinafter described.

The valve mechanism 506 is embodied in a suitably sectionalized casing 510 whereby the parts of the valve mechanism may be readily assembled and disassembled therein, the casing 510 being illustrated without sectionalization for the purpose of simplicity.

The valve mechanism 506 includes a fluid pressure differential operated valve device 511, a pair of magnet valve devices 512 and 513, a safety valve device 514 and a pair of pneumatic switch devices 515 and 516.

The valve device 511 may comprise a movable abutment, such as a diaphragm 519, having at one side thereof a chamber 521, which is constantly connected to the signal pipe 505 through a passage 522 and a pipe 523, and having at the other side thereof a chamber 524.

The diaphragm 519 has a follower disc 525 secured thereto, in any suitable manner, at the side thereof open to the chamber 521 and, interposed in the chamber 521 between the follower 525 and the casing 510, is a spring 526 which yieldingly urges the diaphragm 519 downwardly.

The chamber 521 is open, through a port or bore 528, to a passage 529 which leads to and opens into the chamber 524, the passage 529 having a restricted opening 531 therein. A poppet valve 532, having a fluted stem 533 slidably operating in the bore 528, is normally unseated from its associated valve seat on the casing 510 to open the port 528. Interposed between the valve 532 and the follower disc 525 is a coil spring 534 which is effective when the diaphragm 519 is flexed upwardly to yieldingly maintain the valve 532 seated on its associated valve seat.

The diaphragm 519 is adapted also to control the operation of a pair of oppositely seating valves 536 and 537 which are contained, respectively, in the chamber 524 and in a chamber 538 in the casing 510. Chamber 538 is constantly open to atmosphere through a port 540. The valves 536 and 537 are provided with fluted stems which operate in suitable bores and meet in end-to-end contact within a chamber 539 located between the chambers 524 and 538.

Suitably carried on the face of the diaphragm 519 which is open to the chamber 524 is a follower 541 which has a stem 542 that extends downwardly into engagement with the valve 536. Normally the spring 526 urges the diaphragm 519 downwardly and causes the valve 536 to be seated and the valve 537 to be unseated. A spring 543, contained in the chamber 538 and interposed between the valve 537 and the casing, yieldingly resists unseating of the valve 537. When the diaphragm 519 moves upwardly to free the valves 536 and 537 for movement, spring 543 acts to shift the valves 536 and 537 to unseated and seated positions respectively.

The pneumatic switch device 516 is illustrated diagrammatically as comprising a movable abutment in the form of a piston 545 having at one side a chamber 546 which is constantly connected through a passage 547 to the chamber 539 and having at the opposite side a chamber 550. The piston 545 has a stem 548 which carries in insulated relation thereon a pair of contact members 549 and 551 which are adapted to engage, in circuit-closing relation, a pair of contact fingers 552 and a pair of contact fingers 553 respectively. A spring 555 contained in the chamber 547 and interposed between the piston 545 and the casing 510 normally yieldingly urges the piston in the right-hand direction to cause the contact members 549 and 551 to disengage the pairs of contact fingers 552 and 553, respectively. When fluid under pressure is supplied to the chamber 546 under the control of the valve device 511 in the manner to be hereinafter described, the piston 545 is shifted against the resistance of the spring 555 to cause the contact members 549 and 551 to engage the respectively associated contact fingers 552 and 553 in circuit-closing engagement.

The magnet valve device 512 comprises a pair of oppositely seating valves 558 and 559 contained in a chamber 561 and a chamber 562, respectively, and operated by an electromagnet 564 through the medium of a plunger or stem 565. Contained in the chamber 562 and interposed between the valve 559 and the casing 510 is a biasing spring 563 which normally yieldingly urges the valve 559 into seated relation on a cooperating valve seat. The valve 559 has a fluted stem which meets the fluted stem of the valve 558 in end-to-end contact within a chamber 567 located between the chamber 561 and 562 and, accordingly, the spring 563 is effective when shifting the valve 559 into seated relation, to also unseat the valve 558.

The chamber 567 is constantly connected through a passage 571 to a volume chamber or reservoir 569 in the casing 510, and the valve 558, when unseated, opens communication therepast from the chamber 567 to the chamber 561 which is constantly open to atmosphere through a passage 572 containing a restricted port or passage 573 therein for a purpose which will be hereinafter made apparent. The chamber 562 is constantly connected to the signal pipe 505 through a branch pipe and passage 574.

When the electromagnet 564 is energized, the plunger 565 is actuated to shift the valves 558 and 559 downwardly against the force of spring 563 into seated and unseated positions, respectively. In the seated position of the valve 558, communication is cut off between the chambers 567 and 561 and in the unseated position of the valve 559, communication is established from the chamber 562 to the chamber 567.

The safety valve device 514 may comprise a movable abutment in the form of a diaphragm 576 suitably mounted in the casing and having at one side thereof a chamber 577 which is constantly connected through a pipe and passage 578 to the release reservoir 507. At the opposite side of the diaphragm 576 is a chamber 579 which is constantly connected to the chamber 567 of the magnet valve device 512 through a passage 581.

Disposed in the chamber 579 and suitably attached to the diaphragm 576 is a follower disc 583 having a stem 584 on which is carried a poppet valve 585 which is normally seated on an associated valve seat to close an atmospheric port 586 through which the chamber 579 is connected to atmosphere.

Interposed between the follower disc 583 and the casing 510 is a coil spring 587 which yieldingly urges the diaphragm upwardly and consequently tends to unseat the valve 585.

The release reservoir 507 is connected to the signal pipe 505 through a branch pipe 589 containing the non-return valve 508 which permits flow of fluid under pressure from the signal pipe 505 through the pipe 589 to charge the release reservoir 507 but which prevents reverse flow of fluid under pressure therepast.

The pressure in the release reservoir 507 acting in the chamber 577 at the upper side of the diaphragm 576 overcomes the force of the spring 587 and consequently maintains the valve 585 normally seated to close the atmospheric exhaust port 586.

The pneumatic switch device 515 is illustrated diagrammatically and may comprise a movable abutment in the form of a piston 591 having at one side thereof a chamber 592, which is constantly open to the passage 572 through a branch passage 593, and having at the opposite side a chamber 595 containing a coil spring 596 which is interposed between the piston and the casing 510 to normally yieldingly urge the piston into contact with a stop shoulder 597 formed on the casing 510.

The piston 591 has a stem 598 which carries in insulated relation thereon a contact member 599 which is effective to engage in circuit-closing relation a pair of stationary insulated contact fingers 601.

With the piston 591 shifted into contact with the stop shoulder 597, as shown, the contact member 599 is out of engagement with the contact fingers 601. When the pressure of the fluid supplied under the control of the magnet valve device 512 into the passage 572 and chamber 592 is sufficient to overcome the spring 596, the piston 591 is shifted so that the contact member 599 engages the contact fingers 601 in circuit-closing engagement. As will be hereinafter more clearly explained, the restricted passage 573 in the passage 572 restricts the flow to atmosphere of the fluid under pressure supplied into the passage 572 and thus enables the maintenance of pressure in the passage 572 and in the chamber 592 for a certain interval of time.

The magnet valve device 513 may comprise a valve 603 which is operated by an electromagnet 604 through the medium of a plunger or stem 605. The valve 603 is contained in a chamber 606 which is constantly connected through a passage 607 to the passage 578 and thus to the release reservoir 507. A coil spring 608 contained in the chamber 606 and interposed between the valve 603 and the casing 510 normally yieldingly urges the valve 603 into seated relation on an associated valve seat to close communication from the chamber 606 past the valve to a chamber 609 which is constantly connected to the signal pipe 505 through the passage 522 and branch pipe 523. When the electromagnet 604 is energized, the plunger 605 is actuated to shift the valve 603 against the force of the spring 608 away from its valve seat to open communication from the chamber 606 to the chamber 609.

The circuit connections through the adhesion adapter device 18b are similar to those indicated for the embodiment in Fig. 6 with the exception of the connection through the contact segment 119b. Contact segment 119b of the adapter device 18b is connected by a wire 621 to one of the contact fingers 323 of the relay 29, the other contact finger 323 being connected by wire 622 to one terminal of the electromagnet 564 of the magnet valve device 512. The other terminal of the electromagnet 564 is connected by a wire 623 to ground and, through ground, to the grounded terminal of the battery 22. It will thus be apparent that the engagement of the brush 125b of the adapter device 18b with the contact segment 119b serves to complete a circuit for energizing the electromagnet of the magnet valve device 512.

The circuit connections for effecting the energization of the electromagnet 211 of the slow release magnet valve device 147 of the control valve mechanism 16 also differs from that in the embodiment shown in Figs. 1 and 6. Instead of the energization of the magnet valve device 147 being contingent on the closing of the retardation control relay 31, as in the embodiment shown in Figs. 1 and 6, the energization of the electromagnet of the slow release magnet valve device 147 is contingent on the engagement of the contact member 551 of the pneumatic switch device 516 with the contact fingers 553. One of the contact fingers 553 is connected by the wire 364 to the wire 106 which is, in turn, connected to the contact segment 117b in the adhesion adapter device 18b, and the other contact finger 553 is connected by wire 365 to the non-grounded terminal of the electromagnet of the slow release magnet valve device 147. It will thus be apparent that both the engagement of brush 125b of the adhesion adapter device 18b with the contact segment 117b and the actuation of the contact member 551 of the pneumatic switch device 516 to circuit-closing position, are required to complete the circuit for energizing the slow release magnet valve device 147 of the control valve mechanism 16.

One of the contact fingers 601 of the pneumatic switch device 515 is constantly connected by a wire 625 to the nongrounded terminal of the battery 22, and the other contact finger 601 is constantly connected by a wire 626 to one of the contact fingers 522 of the pneumatic switch device 516. The other contact finger 552 of the pneumatic switch device 516 is constantly connected by a wire 627 to one terminal of the electromagnet 604 of the magnet valve device 513. The other terminal of the electromagnet 604 is connected by a wire 628 to ground and, through ground, to the grounded terminal of the battery 22. It will thus be apparent that energization of the electromagnet 604 of the magnet valve device 513 is contingent on the simultaneous actuation to circuit-closing position of the contact member 599 and the contact member 549 of the pneumatic switch devices 515 and 516, respectively.

*Operation of equipment shown in Fig. 7*

The brake pipe 501 and the signal pipe 505 are normally charged in the usual manner. The triple valve 502 is accordingly conditioned to effect the charging of the auxiliary reservoir 503 in well known manner and at the same time to establish communication to atmosphere through the usual exhaust port of the triple valve so that fluid under pressure is vented from the brake cylinder 12 and the brakes accordingly released. Fluid under pressure flows from the signal pipe 505 through the branch pipe 589 and past the non-return valve 508 to charge the release reservoir 507 to the pressure in the signal pipe, the chamber 577 at the upper side of the diaphragm 576 of the safety valve device 514 being thus correspondingly charged.

Fluid under pressure also flows from the signal pipe 505 through the branch pipe 523 and passage 522 to the chamber 521 of the valve device 511 thus assisting the spring 526 in urging the diaphragm 519 downwardly to seat the valve 536 and unseat the valve 537. Fluid under pressure thus flows past the unseated valve 532 into the passage 529 and through the restricted passage 531 to the chamber 524. Since the valve 536 is closed, the pressure in the chambers 524 and 521 equalizes. The spring 526 thus maintains the valve 536 seated, the force of the spring 543 being insufficient to overcome the spring 526 and unseat the valve 536.

With the valve 537 unseated, the chamber 546 at the one side of the piston 545 of the pneumatic switch device 516 is vented to atmosphere by way of the passage 547, chamber 539, past the unseated valve 537, chamber 538 and exhaust port 540. The spring 555 thus shifts the piston 545 so as to effect disengagement of the contact members 549 and 551 from their associated contact fingers.

Since the brush 126b of the adhesion adapter device 18b is out of engagement with the contact segment 119b, and since the pneumatic switch device 27 is in open position, the magnet valve device 512 is deenergized. Consequently the valves 558 and 559 of the magnet valve device 512 are unseated and seated, respectively. Fluid under pressure thus flows from the signal pipe 505 through the pipe 574 to the chamber 562 of the magnet valve device 512 while the volume chamber 569, the chamber 567 of the magnet valve device 512, and the chamber 579 at the lower side of the diaphragm 576 of the safety valve device 514 are connected past the unseated valve 558 through the chamber 561 and passage 572 to atmosphere. With the pressure in the chamber 592 at the lower side of the piston 591 of the pneumatic switch device 515 at atmospheric pressure, the spring 596 shifts the piston so that the contact member 599 is in circuit-opening position.

With the equipment conditioned as shown and charged with fluid under pressure in the manner just described, and with the car or train traveling along the track under power, an application of the brakes may be made by first cutting off the motive power and then effecting a reduction in the pressure of the fluid in the brake pipe 501 in the usual manner, as by a brake valve device not shown. Upon the reduction of the pressure in the brake pipe 501, the triple valve 502 operates in well known manner to cause fluid under pressure to flow from the auxiliary reservoir 503 to the brake cylinder 12 by way of the pipe 159, supply passage 158 in the control valve mechanism 16, past the cut-off valve device 142 and through pipe 165 (see Figs. 7 and 5).

The pressure of the fluid supplied to the brake cylinder 12 causes application of the brakes in well known manner and, at the same time, actuates the pneumatic switch device 27 into circuit-closing position to connect the battery 22 to the contact segment 115b of the adhesion adapter device 18b.

Assuming that the braking force corresponding to the pressure of the fluid supplied to the brake cylinder 12 is sufficient to produce such retardation of the car or train as to cause shifting of the brushes 124b to 127b in the left-hand direction, as viewed in Fig. 7, to a degree that the brush 125b engages the contact segment 117b, a circuit is completed for energizing the electromagnet 187 of the cut-off magnet valve device 146. This circuit extends from the non-grounded terminal of battery 22 through the train wire 24, pneumatic switch device 27 and wire 108, the contact segment 115b, thence through the brushes 124b and 125b, contact segment 117b, wires 106 and 355, electromagnet 187 of the cut-off magnet device 146 and, through ground, to the grounded terminal of the battery 22. Thus, as previously described in connection with the embodiment shown in Fig. 1, the cut-off valve device 142 is actuated immediately to closed position to cut off the further supply of fluid under pressure to the brake cylinder 12.

When, due to the reduction in the speed of the train and the consequent increase in the coefficient of friction between the brake shoes and the car wheels, the rate of retardation produced by the attained braking force increases sufficiently that engagement of the brush 126b with the contact segment 119b is effected, a circuit is completed for energizing the electromagnet 564 of the magnet valve device 512. This circuit extends from the battery 22 through the pneumatic switch device 27 and to the brush 126b of the adhesion adapter device 18b in the manner similar to that in previously described embodiments, thence through the contact segment 119b, wire 621, contact fingers 323 and contact member 322 of the relay 29, wire 622, electromagnet 564 of the magnet valve device 512, wire 603 to ground, and back to the grounded terminal of the battery 22 through ground.

Energization of the electromagnet 564 of the magnet valve device 512 thus causes the valve 558 and the valve 559 to be shifted into seated and unseated positions, respectively. The valve 558, when seated, cuts off the communication from the volume chamber 569 and the chamber 579 of the safety valve device 514 to atmosphere and the valve 559, when unseated, opens communication through which fluid under pressure flows from the signal pipe 505 to the volume chamber 569 and the chamber 579 of the safety valve device 514 to effect a sudden rapid reduction in the pressure in the signal pipe 505. In view of the fact that the non-return valve 508 prevents the back flow of fluid under pressure from the release reservoir 507, the pressure in the release reservoir 507 is maintained at the higher pressure originally existing in the signal pipe, as is the pressure in the chamber 577 at the upper side of the diaphragm 576 of the safety valve device 514. When the pressure of the fluid in the volume chamber 569 and in the chamber 579 at the lower side of the diaphragm 576 of the safety valve device 514 builds up sufficiently that the combined force of the fluid pressure in the chamber 579 and the force exerted upwardly by the biasing spring 587 slightly exceeds the release reservoir pressure in the chamber 577, the valve 585 is unseated sufficiently so that fluid under pressure leaks out to atmosphere through the port 586 and thus maintains a predetermined differential of pressure between the original signal pipe pressure and the reduced pressure in the signal pipe notwithstanding that the signal pipe pressure is tending to be restored to its original pressure through a feed valve device in the usual manner.

The sudden rapid reduction of the pressure in the signal pipe 505 produces a corresponding sudden rapid reduction in the pressure in the chamber 521 at the upper side of the diaphragm 519 of the valve device 511. The restricted passage 531 in the communicating passage 529 between the chamber 521 at the upper side of the diaphragm 519 and the chamber 524 at the lower side of the diaphragm 519, however, prevents the pressure in the chamber 524 from reducing at the same rate as the pressure in the chamber 521 is reduced and, consequently, the higher fluid pressure in the chamber 524 flexes the diaphragm 519 upwardly against the force of the spring 526 and the reduced pressure in the chamber 521 to effect the seating of the valve 532. The valve 532, when seated, prevents further reduction of pressure in the chamber 524. The upward flexing of the diaphragm 519 shifts the stem 542 away from the valve 536 sufficiently that the spring 543 becomes effective to seat the valve 537 and unseat the valve 536. Communication from the chamber 546 at the right-hand side of the piston 545 of the pneumatic switch device 516 to atmosphere is thus cut off by the valve 537 and communication is established by valve 536 through which fluid under pressure in the chamber 524 flows to the chamber 546 to cause shifting of the piston 545 in the left-hand direction against the force of the spring 555. The contact members 549 and 551 of the pneumatic switch device 516 are thus actuated into circuit-closing position.

It will be understood that the brush 126b of adhesion adapter devices associated with other wheel trucks throughout the train may not all simultaneously engage their associated contact segments 119b, but, in any case, the brush 125b on all adhesion adapter devices for all trucks will be in contact with the contact segment 117b when the first brush 126b contacts its associated contact segment 119b.

It will be understood, therefore, that notwithstanding that the brush 126b of some adhesion adapter devices along the length of the train may not have engaged their corresponding contact segment 119b, nevertheless, the sudden rapid reduction in the signal pipe pressure will have effected actuation of the valve device 511 of the valve mechanism 506 corresponding thereto. Consequently, the pneumatic switch devices 516 for each of the valve mechanisms 506 along the length of the train will be substantially simultaneously actuated to circuit-closing position.

With the contact member 551 of the pneumatic switch device 516 in circuit-closing contact with the associated contact fingers 553, a circuit is completed for energizing the electromagnet 211 of the slow release magnet valve device 147 (see Figs. 5 and 7), this circuit extending from the battery 22 through the pneumatic switch device 27 to the brush 125b of the adhesion adapter device 18b in the manner evident from previous descriptions, thence through the contact segment 117b, wires 106 and 364, contact fingers 553 and contact member 551 of the pneumatic switch device 516, wire 365, electromagnet 211 of the slow release magnet valve device 147, through ground to the opposite terminal of the battery 22.

As in the operation of the equipment shown in Fig. 1, energization of the slow release magnet valve device 147 results in the unseating of the valve piston 201 of the slow release valve device 143 and thus fluid under pressure is released from the brake cylinder 12 to atmosphere through the restricted port 209 of the choke fitting 208 (see Fig. 5).

When, due to the reduction in brake cylinder pressure, and accordingly in the braking force, the rate of retardation of the cars or train of cars reduces sufficiently to permit recession of the brushes 124b to 127b of the adhesion adapter device 18b back toward their normal or neutral positions so as to cause the brush 126b to disengage the contact segment 119b, the circuit previously traced for energizing the electromagnet 564 of the magnet valve device 512 is interrupted.

Upon the deenergization of the electromagnet 564 of the magnet valve device 512 the spring 563 immediately and positively shifts the valve 558 and 559 to unseated and seated positions, respectively. The valve 559, when seated, cuts off the supply of fluid under pressure from the signal pipe 505 to the volume chamber 569 and the chamber 579 at the lower side of the diaphragm 576 of the safety valve device 514. The valve 558, when unseated, establishes communication through which fluid under pressure in the chambers 569 and 579 flows to atmosphere by way of the chamber 561, passage 572 and restricted passage 573. Due to the restriction of the passage 573, however, a sufficient pressure is maintained in the passage 572 and chamber 592 at the lower side of the piston 591 of the pneumatic switch device 515 to actuate the contact member 599 into circuit-closing contact with its associated contact fingers.

In view of the fact that the contact member 549 of the pneumatic switch 516 is also at this time in circuit-closing position, the actuation of the pneumatic switch device 515 to circuit-closing position establishes a circuit through which the electromagnet 604 of the magnet valve device 513 is energized, this circuit extending from the non-grounded terminal of the battery 22 through wires 341 and 625, contact fingers 601 and contact member 599 of the pneumatic switch device 515, wire 626, contact fingers 552 and contact member 549 of the pneumatic switch device 516, wire 627, electromagnet 604 of the magnet valve device 513, wire 628 to ground and back, through ground, to the grounded terminal of the battery 22.

Due to the energization of the electromagnet 604, valve 603 of the magnet valve device 513 is accordingly unseated and establishes communication from the release reservoir 507 to the signal pipe 505, and to the chamber 521 at the upper side of the diaphragm 519 of the valve device 511, this communication extending from the release reservoir 507 through the pipe and passage 578, passage 607, chamber 606, past the unseated valve 603, chamber 609, passage 522 to chamber 521, and branch pipe 523 to the signal pipe 505. In view of the fact that the pressure maintained in the release reservoir 507 is a predetermined amount higher than the reduced pressure in the signal pipe 505, it will be apparent that the pressure in the release reservoir 507 of the equipment shown, as well as the corresponding release reservoirs of similar equipment associated with other wheel trucks, tends to rapidly build up the pressure in the signal pipe toward its normal original pressure.

As the pressure in the chamber 521 of the valve mechanism 506 approaches its normal degree, the spring 526 at the upper side of the diaphragm 519 causes the diaphragm 519 to be shifted downwardly and thus effect shifting of the valves 536 and 537 to seated and unseated positions, respectively, while at the same time effecting the unseating of the valve 532 to reestablish the pressure equalizing communication between the chambers 521 and 524 through the communicating passage 529.

Upon the unseating of the valve 537 the chamber 546 at the right-hand side of the piston 545 of the pneumatic switch device 516 is vented to atmosphere through the port 540 and, consequently, the spring 555 shifts the piston so that the contact members 549 and 551 are moved into circuit-opening position.

The circuits previously traced, through which the electromagnet of the slow release magnet valve device 147 and the electromagnet 604 of the magnet valve device 513 were energized, are thus interrupted, and the electromagnets 211 and 604 are accordingly deenergized. Deenergization of the electromagnet 211 of the slow release magnet valve device 147 results in closing of the slow release valve device 143 in the manner previously described in connection with the embodiment shown in Fig. 1 and thus further reduction in brake cylinder pressure is cut off. At the same time, the deenergization of the electromagnet 604 of the magnet valve device 513 causes the valve 603 to be reseated to close off the connection from the release reservoir 507 to the chamber 521 and signal pipe 505.

It will be understood that the restricted passage 573 in the passage 572 is so designed as to maintain sufficient pressure effective in the chamber 592 on the piston 591 of the pneumatic switch device 515 that the pneumatic switch 515 remains in circuit-closing position as long as the contact member 549 of the pneumatic switch device 516 is in circuit-closing position. It will be apparent that by providing the magnet valve device 513 for causing a sudden and rapid rebuilding of the pressure in the signal pipe 505 and in the chamber 521 at the upper side of the diaphragm 519 of the valve device 511, a sudden and rapid reduction in the pressure in the chamber 546 at the right-hand side of the piston 545 of the pneumatic switch device 516 substantially instantaneously with the disengagement of the brush 126b from the contact segment 119b of the adapter device 18b is effected.

Thus, by cutting off the further reduction in brake cylinder pressure substantially upon the disengagement of the brush 126b from the contact segment 119b of the adhesion adapter device 18b, the brushes 124b and 127b do not recede back toward the normal or neutral position sufficiently to cause the brush 125b to disengage the contact segment 117b and, as a result, the cut-off magnet valve device 146 remains energized to prevent the further supply of fluid under pressure to the brake cylinder 12 past the cut-off valve device 142.

When, as a result of further reduction in the speed of travel of the car or train of cars and the corresponding increase in the coefficient of friction between the brake shoes and the car wheels, the rate of retardation produced on the car or train becomes sufficient to cause the brush 126b to re-engage the contact segment 119b, the above described operation is repeated to effect a further reduction in brake cylinder pressure.

The cycle of operation, as above described, is thus repeated successively so that the rate of retardation of the cars or train of cars is maintained, at a substantially constant rate.

In the same manner as described in connection with the embodiment shown in Fig. 1, whenever the car or train has been brought to a complete stop and the brushes of the adhesion adapter devices associated with the various wheel trucks are in the normal or neutral position thereof, the circuit for energizing the electromagnet 187 of the cut-off magnet valve device 146 is interrupted and, consequently, the electromagnet 187 is deenergized. As a result, the pressure of the fluid in the supply passage 158 and in the annular chamber 186 of the control valve mechanism 16 as well as the pressure in the chamber 164, is effective to unseat the valve piston 181 of the cut-off valve device 142. Since the pressure in the brake cylinder is less than that established in the supply passage 158, fluid under pressure is supplied past the unseated valve piston 181, to build up the pressure in the brake cylinder from the reduced pressure therein to a higher value corresponding to the pressure established in the supply passage 158. Thus, although the brake cylinder pressure was reduced in the manner previously described to effect a substantially constant rate of retardation of the car or train, the original pressure established in the supply passage 158 is substantially reestablished in the brake cylinder when the car or train comes to a complete stop.

Obviously, with the car or train at a stop, the pressure in the brake cylinder may be increased to any desired degree up to the maximum attainable by effecting a reduction in the brake pipe pressure and thus causing operation of the triple valve device 502 to further supply fluid under pressure to the brake cylinder.

*Release of the brakes in the embodiment shown in Fig. 7*

Release of the brakes following an application thereof in the manner just described, may be effected by increasing the pressure in the brake pipe in the usual manner and thereby effecting operation of the triple valve device 502 to establish the usual exhaust communication in the triple valve for reducing the pressure in the pipe 159, supply passage 158 and brake cylinder 12. Fluid under pressure is released from the brake cylinder 12 past the one-way valve 271 in the control valve mechanism 16 in the same manner as previously described for the embodiment shown in Fig. 1.

It will be apparent that a graduated release of the brakes may be effected at any time, if desired, by increasing pressure in the brake pipe 501 in steps so that the triple valve 502 may operate successively to reduce the pressure in the brake cylinder 12.

*Anti-wheel sliding operation for embodiment shown in Fig. 7*

In the event that during an application of the brakes, the wheels of the wheel-and-axle unit associated with the adhesion adapter device 18b begin to slip, the operation of the equipment is the same as previously described for the embodiment shown in Fig. 1. Briefly, the engagement of the brush 127b with the contact segment 121b completes a circuit for energizing the electromagnet 243 of the fast release magnet valve device 148 and thus causes a rapid reduction in brake cylinder pressure to be effected. Upon the subsequent acceleration of the wheels back to a speed of rotation corresponding to the speed of travel of the train and the engagement of the brush 127b with the contact segment 120b, the energization of the electromagnet 167 of the application magnet valve device 145 which results, causes the application valve device 141 to supply fluid under pressure to the brake cylinder 12.

Also in the same manner as described in connection with the embodiment shown in Fig. 1, engagement of the brush 127b with the contact segment 121b effects energization of the wheel-slip relay 29 and thus causes the circuit for the electromagnet 564 of the magnet valve device 512 of the valve mechanism 506 to be interrupted. Thus, when the wheels of an individual wheel-and-axle unit begin to slip, the action is entirely local to the equipment for that wheel truck, in view of the fact that no reduction in the pressure in the signal pipe 505 is effected.

SUMMARY

Summarizing, it will be seen that I have described several embodiments of a brake control equipment for high speed trains, which brake equipment enables the application and automatic regulation of the brakes in such manner as to produce substantially constant high rates of retardation heretofore not attained and resulting in correspondingly shorter stopping distances. The equipment in each of the several embodiments includes a so-called adhesion adapter device and a control valve mechanism, both of novel construction and function. The control valve mechanism is interposed between the brake cylinder and the source of supply and controls the supply of fluid under pressure to the brake cylinder and the release of fluid under pressure therefrom as influenced by the operation of the adhesion adapter device both for the purpose of regulating the brake cylinder pressure, and accordingly the braking force, to maintain a substantially constant rate of retardation of the car or train during an application of the brakes, and for the purpose of preventing sliding of the wheels.

The operation of the control valve mechanism and the adhesion adapter devices is such as to localize the reduction in brake cylinder pressure to the brake cylinder or brake cylinders associated with the particular car wheels which begin to slip, the pressure in the brake cylinder for those car wheels which do not slip being controlled in the ordinary manner as for regulation to a constant rate of retardation. The control valve mechanism and the adhesion adapter device functioning together are effective, when the associated car wheels begin to slip, to automatically and rapidly reduce the brake cylinder pressure during the slipping interval so that actual sliding of the wheels in a locked position cannot occur, or at least is quite unlikely. Furthermore, the operation is such that when the wheel slipping condition ceases to exist, the pressure in the brake cylinder associated with the wheel which began to slip is restored to a lesser value than the pressure which initiated the wheel slipping condition. Thus, reoccurrence of the wheel slipping condition is unlikely. Should a slipping of the wheels recur, the restored brake cylinder pressure becomes less and less with each operation of the equipment until the braking force corresponding thereto is attained which is insufficient to cause slipping of the wheels.

A suitable electrical system including so-called direction-determining relays is provided whereby the adhesion adapter devices may function automatically for either the forward or the backward direction of travel of the car or train.

The brake control equipments are applicable to any type of fluid pressure brake system, the embodiments shown in Figs. 1 and 6 being illustrated in connection with a so-called straight-air brake system and the embodiment shown in Fig. 7 being shown as applied to the familiar automatic system including a brake pipe and a triple valve device controlled according to variations in pressure in the brake pipe.

The embodiment shown in Fig. 7 is unique in the employment of the usual signal pipe on railroad trains for purposes of brake control communication between the equipments on successive cars of the train, whereby to effect the same control operation for the equipments associated with each wheel truck in regulating the rate of retardation of the train to a substantially constant rate.

While I have shown and described only several embodiments of my invention, it will be understood that various modifications, omissions or additions may be made in any of the embodiments without departing from the spirit of the invention. It is accordingly not my intention to limit the scope of my invention except as necessitated by the scope of the prior art.

Having now described my invention, what I claim as new and desire to secure by Letters Patent, is:

1. In a fluid pressure brake system for a car or train, in combination, means manually operative to control the application and the release of the brakes, rotary inertia operated means rotated according to the direction and speed of rotation of a car wheel and shiftable forwardly and backwardly of the direction of rotation thereof with respect to a normal position in accordance with the rate of retardation and acceleration, respectively, of the car wheel, and means controlled by the rotary inertia operated means and operative to effect a reduction in the braking force, effecting application of the brakes, at a certain rate as long as the retardation of the car wheel does not exceed a certain rate and operative to reduce the braking force at a rate faster than the said certain rate when the retardation of the car wheel exceeds the said certain rate.

2. In a fluid pressure brake system for a car or train, in combination, a brake cylinder, means manually operative to control the supply of fluid under pressure to and the release of fluid under pressure from the brake cylinder to effect, respectively, the application and the release of the brakes, rotary inertia operated means rotated according to the direction and speed of rotation of a car wheel and shiftable forwardly and backwardly of the direction of rotation thereof with respect to a normal position in accordance with the rate of retardation and acceleration, respectively, of the car wheel, and means controlled by the rotary inertia operated means for reducing the brake cylinder pressure at a certain rate upon retardation of the car wheel as long as the wheel does not slip for causing a substantially constant rate of retardation of the car wheel and for reducing the brake cylinder pressure at a rate faster than the said certain rate in the event that the car wheel begins to slip for preventing sliding of the car wheel.

3. In a fluid pressure brake system for a car or a train, in combination, means operative manually to control the application and the release of the brakes, means automatically effective only as long as the retardation of a car wheel exceeds a certain rate while the wheel is slipping due to the application of the brakes for reducing the braking force to prevent sliding of the wheel, and means automatically effective only as long as the acceleration of the car wheel exceeds a certain rate in returning to a speed corresponding to the speed of the car following a reduction in the speed of the wheel due to slipping for effecting an increase in the braking force.

4. In a fluid pressure brake system for a car or a train, in combination, means operative manually to control the application and the release of the brakes, means automatically effective as long as the retardation of a car wheel exceeds a certain rate while the wheel is slipping due to the application of the brakes for reducing the braking force to prevent sliding of the car wheel, means automatically effective as long as the acceleration of the car wheel exceeds a certain rate in returning to a speed corresponding to the speed of the car following a reduction in speed of the wheel due to slipping, for effecting an increase in the braking force, said last means being so constructed and operated as to effect restoration of braking force by an amount which is less than the amount the braking force was automatically reduced.

5. In a vehicle or train brake system, in combination, means for controlling the brakes to cause a chosen degree of application and to release the brakes, means operative upon slipping of a vehicle wheel, caused by application of the brakes to the chosen degree, for so reducing the degree of application of the brakes on the slipping wheel as to prevent sliding thereof, and means automatically operative, upon relief of the slipping condition of said wheel, for effecting reapplication of the brakes on the wheel which slipped to a degree the ultimate value of which is substantially less than said chosen degree.

6. In a vehicle or train brake system, in combination, means for controlling the brakes to cause a chosen degree of application and to release the brakes, means operative responsively to slipping of a vehicle wheel caused by application of the brakes to the chosen degree for so reducing the degree of application of the brakes on the slipping wheel as to prevent sliding thereof, and means operative responsively to the increase in speed of the wheel which slipped, subsequent to the reduction in the degree of application of the brakes on the wheel which slipped, for effecting reapplication of the brakes on the wheel which slipped and effective to limit the reapplication both while the vehicle is in motion and after the vehicle stops to a degree which is substantially less than the chosen degree which initiated the slipping of the wheel.

7. In a vehicle or train brake system, in combination, a brake cylinder for operating the brakes on a vehicle wheel or wheels, means for effecting a supply of fluid to said brake cylinder to establish a chosen pressure to effect an application of the brakes, means operative responsively to slipping of a vehicle wheel due to application of the brakes for reducing brake cylinder pressure to relieve the wheel slipping condition, means operative responsively to an increase in speed of the slipping wheel following relieving of the wheel slipping condition for increasing brake cylinder pressure, and means for limiting the ultimate brake cylinder pressure, upon said increase, to a pressure lower than said chosen pressure.

8. In a vehicle or train brake system, in combination, a brake cylinder for operating the brakes on a vehicle wheel or wheels, means for effecting a supply of fluid under pressure to said brake cylinder to effect an application of the brakes, means operable in response to a diminution in speed of the braked wheel or wheels below that corresponding to the speed of the vehicle or train for decreasing brake cylinder pressure to permit the wheel or wheels to rotate at a speed corresponding to vehicle or train speed, and means operable upon an increase in speed of said wheel or wheels following said reduction of brake cylinder pressure for increasing brake cylinder pressure for a time interval proportional to the time that said wheel or wheels exceed a certain rate of acceleration in approaching a speed corresponding to the speed of the vehicle.

9. In a vehicle or train brake system, in combination, a brake cylinder for operating the brakes on a vehicle wheel or wheels, means for effecting a supply of fluid under pressure to said brake cylinder to effect an application of the brakes, two rotatable bodies, a first one of which is driven by and according to the speed of the braked wheel or wheels and the second of which is driven by the first, means providing for relative rotational movement of either of said bodies with respect to the other in either of two directions upon a change in speed of the other while rotating in either of two directions, said means being operative to restore said bodies to their original relative positions upon termination of the change in speed of either, means operative upon movement of said first body relative to the second body due to a rapid decrease in speed of the first body for reducing brake cylinder pressure, and means operative upon movement of said first body relative to the second body due to a rapid increase in speed of the first body for increasing brake cylinder pressure for only so long as the rate of increase in speed of said first body exceeds a certain rate.

10. In a fluid pressure brake system for a car or train, in combination, a brake cylinder, means manually operative to control the supply of fluid under pressure to and the release of fluid under pressure from the brake cylinder to effect, respectively, the application and the release of the brakes, rotary inertia operated means rotated according to the direction and speed of rotation of a car wheel and shifted forwardly and backwardly of the direction of rotation thereof with respect to a normal position in accordance with the rate of retardation and acceleration, respectively, of the car wheel, means controlled by the forward shifting of the inertia means and operative as long as the retardation of the car wheel exceeds a certain rate for effecting a reduction in brake cylinder pressure, and means controlled by the backward shifting of the inertia means resulting from the acceleration of the car wheel toward the speed corresponding to the speed of the car following a reduction in speed of the wheel due to slipping, and operative only while the acceleration of the car wheel exceeds a certain rate for supplying fluid under pressure to the brake cylinder.

11. In a fluid pressure brake system for a car or train, in combination, a brake cylinder, means manually operative to control the supply of fluid under pressure to and the release of fluid under pressure from the brake cylinder to effect, respectively, the application and the release of the brakes, rotary inertia operated means rotated according to the direction and speed of rotation of a car wheel and shifted forwardly and backwardly of the direction of rotation thereof with respect to a normal position in accordance with the rate of retardation and acceleration, respectively, of the car wheel, means controlled by the forward shifting of the inertia means and operative as long as the retardation of the car wheel exceeds a certain rate for effecting a reduction in brake cylinder pressure, and means controlled by the backward shifting of the inertia means resulting from the acceleration of the car wheel toward the speed corresponding to the speed of the car following a reduction in the speed of the wheel due to slipping, and operative as long as the acceleration of the car wheel exceeds a certain rate for supplying fluid under pressure to the brake cylinder, said last means being so constructed and operated as to effect the restoration in the brake cylinder of a pressure substantially less than the pressure which initiated the slipping of the car wheel, thereby minimizing the likelihood of the recurrence of the wheel slipping.

12. In a fluid pressure brake system for a car or train, in combination, means manually operative to control the application and the release of the brakes associated with a car wheel, inertia operated means responsive to the retardation of the car wheel for so controlling the degree of the braking force effecting application of the brakes to the car wheels as to produce a substantially constant rate of retardation of the car wheels as long as the car wheel does not slip and operative to so control the degree of the braking force as to prevent sliding of the car wheel in the event that the car wheel begins to slip, and means for rendering said inertia operated means ineffective to control the degree of the braking force unless a certain predetermined degree of braking force is established.

13. In a fluid pressure brake system for a car or train, in combination, a brake cylinder, means manually operative to control the supply of fluid under pressure to and the release of fluid under pressure from the brake cylinder to effect, respectively, the application and the release of the brakes, inertia operated means responsive to the rate of retardation of a car wheel for so controlling the brake cylinder pressure as to produce a substantially constant rate of retardation of the car wheel as long as the car wheel does not slip and operative to so control the brake cylinder pressure as to prevent sliding of the car wheel in the event that the car wheel begins to slip, and means for rendering said inertia operated means ineffective to control the brake cylinder pressure unless a certain predetermined pressure is established in the brake cylinder.

14. In a fluid pressure brake system for a car or train, in combination, a brake cylinder, means operative manually to control the supply of fluid under pressure to and the release of fluid under pressure from the brake cylinder to effect, respectively, the application and the release of the brakes, a rotatable member driven substantially according to the speed of a car wheel, a rotary inertia element, resilient means interposed between the rotatable member and the inertia element for effecting rotation of the inertia element with rotation of the rotatable member and for yieldingly resisting movement of the inertia element relative to the rotatable member upon retardation of the rotatable member, and valve means controlled according to the degree of movement of the inertia element relative to the rotatable member upon an application of the brakes and operative as long as the degree of movement of the inertia element relative to the rotatable member does not exceed a certain degree for first cutting off the supply of fluid under pressure to the brake cylinder and then releasing fluid under pressure from the brake cylinder at a certain rate, and operative when the movement of the inertia element relative to the rotatable member exceeds the said certain degree to first cut off the supply of fluid under pressure to the brake cylinder and then to release fluid under pressure from the brake cylinder at a rate faster than the said certain rate.

15. In a fluid pressure brake system for a car or train, in combination, means manually operative to control the application and the release of the brakes associated with a car wheel, a rotatable member driven substantially according to the speed of rotation of the car wheel, a rotary inertia element, a single resilient means arranged to hold the rotatable member and the inertia element for rotation together and for yieldingly resisting movement of the inertia element relative to the rotatable member with a uniform force in either direction from a normal position upon acceleration or retardation of the rotatable member, and means controlled according to the degree of movement of the inertia element relative to the rotatable member for so controlling the braking force effecting application of the brakes as to cause a substantially uniform rate of retardation of the car wheel.

16. In a fluid pressure brake system for a car or train, in combination, a brake cylinder, means manually operative to control the supply of fluid under pressure to and the release of fluid under pressure from the brake cylinder to effect, respectively, the application and the release of the brakes, rotary inertia operated means rotated according to the direction and speed of rotation of a car wheel and shifted forwardly and backwardly of the direction of rotation thereof with respect to a normal position in accordance with the rate of retardation and acceleration, respectively, of the car wheel, means controlled by the forward shifting of the inertia means incident to the retardation of the car wheel at a rate less than a certain rate for successively closing off the supply of fluid under pressure to the brake cylinder and for releasing the fluid under pressure from the brake cylinder at a certain rate to cause a substantially constant rate of retardation of the car wheel, means controlled by the forward shifting of the inertia means and operative only in the event of slipping of the car wheel and the consequent retardation thereof at a rate in excess of the said certain rate for successively closing off the supply of fluid under pressure to the brake cylinder and releasing fluid under pressure from the brake cylinder at a rate sufficiently rapid to prevent sliding of the car wheels, and means controlled by the backward shifting of the inertia means as the car wheel accelerates toward the speed corresponding to the speed of the car following a slipping of the wheel for supplying fluid under pressure to the brake cylinder.

17. In a brake system for a train of cars having a plurality of brake units associated respectively with different car wheels, individual inertia means for each of said car wheels operatively responsive to the rate of rotative retardation of the car wheel for controlling the corresponding brake unit to cause application of the brakes in such manner as to either regulate the rate of retardation of the car wheel to a substantially constant rate or so as to prevent sliding of the wheel, means associating all the said inertia means and effective as long as none of the said wheels slip for causing the rate of retardation on all the car wheels to be substantially uniform, as well as substantially constant, and means operative when one of said car wheels begins to slip for isolating the inertia means for that wheel and causing it to function independently to prevent sliding of the associated wheel.

18. In a fluid pressure brake system for a train of cars, in combination, means manually operative to effect application and release of the brakes associated with all the car wheels, a plurality of means actuated respectively in accordance with the rate of rotative retardation of different car wheels produced by application of the brakes, separate means for each of said car wheels controlled by any and all of the retardation actuated means and operative as long as the rate of retardation of the corresponding car wheel does not exceed a certain rate for regulating the braking force effecting application of the brakes on the car wheels in substantially the same manner, and means effective when the rotative retardation of one of the said wheels exceeds the certain rate for causing the corresponding retardation actuated means to effect regulation of the braking force applying the brakes to the said one car wheel in a manner independently of and different from the manner in which the retardation actuated means associated with car wheels other than the said one car wheel regulate the braking force effecting application of the brakes on the said other wheels.

19. In a fluid pressure brake system for a train of cars, a plurality of brake cylinders associated, respectively, with different car wheels, means manually operative to control the supply of fluid under pressure to and the release of fluid under pressure from all of the brake cylinders to effect, respectively, the application and the release of the brakes associated with all of the car wheels, means for each brake cylinder actuated in accordance with the rate of rotative retardation of the associated car wheel produced by an application of the brakes, separate means for each of the brake cylinders controlled by actuation of the corresponding retardation actuated means and operative to regulate the pressure in the corresponding brake cylinder, as long as the rate of retardation of the corresponding car wheel does not exceed a certain rate, so as to cause a substantially uniform and constant rate of retardation on all of the car wheels, and means effective when the retardation of one of the said car wheels exceeds the said certain rate incident to a slipping of the said one car wheel for causing the corresponding retardation actuated means to so control the pressure in the brake cylinder associated with the said one car wheel as to prevent the sliding of the said one car wheel independently of the control of the pressure in the brake cylinders associated with car wheels other than the said certain car wheel.

20. In a fluid pressure brake system for a car or train, in combination, a brake cylinder, means manually operative to control the supply of fluid under pressure to and the release of fluid under pressure from the brake cylinder to effect, respectively, the application and the release of the brakes, a cut-off valve device operative to cut off the supply of fluid under pressure to the brake cylinder, a release valve device operative to release fluid under pressure from the brake cylinder, an application valve device operative to cause fluid under pressure to be supplied to the brake cylinder, an inertia operated member having a normal position and shiftable in one direction from the normal position upon retardation of a car wheel and in the opposite direction from the normal position, upon acceleration of the car wheel, means for causing operation of the said cut-off valve device and the said release valve device in succession upon the shifting of the inertia operated member in the said one direction, means for causing operation of said application valve device upon the shifting of the inertia operated member in the opposite direction, and differential fluid pressure responsive means operated by the reduction in brake cylinder pressure caused by the said release valve device for causing said cut-off valve device to maintain cut off the supply of fluid under pressure to the brake cylinder notwithstanding that the inertia operated member does not remain shifted in the said one direction from the normal position, thereby restricting the control of the supply of fluid under pressure to the brake cylinder to the application valve device.

21. In a fluid pressure brake for a car or train, in combination, a brake cylinder for effecting application of the brakes associated with the car wheels in accordance with the fluid pressure established therein, means providing a communication through which fluid under pressure is supplied to the brake cylinder and released therefrom, means manually operative to control the pressure in the said communication, a cut-off valve device normally permitting fluid under pressure to be supplied from the communication to the brake cylinder and operative to close off the connection between said communication and the brake cylinder, a release valve device operative to vent fluid under pressure from the brake cylinder at a rate sufficiently rapid to prevent sliding of a car wheel which begins to slip, an application valve device operative to cause fluid under pressure to be supplied to the brake cylinder, inertia operated means actuated in accordance with the rate of retardation of a car wheel and effective when the car wheel is retarded at a rate in excess of a certain rate to effect operation of the cut-off valve device, said inertia means being also effective when the car wheel is retarded at a rate in excess of a second certain rate faster than the first said certain rate for effecting operation of the release valve device, and effective upon acceleration of the car wheel back toward the normal speed corresponding to the speed of the car at a rate in excess of a certain rate for effecting operation of the application valve device to supply fluid under pressure to the brake cylinder, and fluid pressure responsive means subject differentially to the pressure of the fluid in the said communication and in the brake cylinder and effective following operation of the release valve device and as long as the brake cylinder pressure remains a certain degree less than the pressure in the communication for causing said cut-off valve device to continue to cut off the connection from the said communication to the brake cylinder thereby limiting the control of the supply of fluid under pressure to the brake cylinder to the application valve device.

22. In a fluid pressure brake system for a car or train, in combination, a brake cylinder, means manually operative to control the supply of fluid under pressure to and the release of fluid under pressure from the brake cylinder to effect, respectively, the application and the release of the brakes, a rotary inertia operated means rotatable in opposite directions corresponding to the direction of rotation of a car wheel for opposite directions of travel of the car and shiftable forwardly or backwardly of the direction of rotation thereof from a normal position in accordance with the rate of retardation and acceleration, respectively, of the car wheel, valve means operative to release fluid under pressure from the brake cylinder and also to supply fluid under pressure to the brake cylinder, and means conditioned according to the initial direction of movement of the inertia operated means with respect to its normal position, in one direction or the opposite direction, upon an application of the brakes for causing said inertia operated means to control the valve means to effect first a release of fluid under pressure from the brake cylinder and then a supply of fluid under pressure to the brake cylinder regardless of which direction the car or train is traveling at the time application of the brakes is initiated.

23. In a fluid pressure brake system for a car or train, in combination, a brake cylinder, means manually operative to control the supply of fluid under pressure to and the release of fluid under pressure from the brake cylinder to effect, respectively, the application and the release of the brakes, a rotary inertia operated means rotatable according to the direction and the speed of rotation of a car wheel and adapted to shift forwardly and backwardly of the direction of rotation with respect to a normal position thereof upon the retardation and the acceleration, respectively, of the car wheel, a valve device operative to release fluid under pressure from the brake cylinder, a second valve device operative to cause fluid under pressure to be supplied to the brake cylinder, and means conditioned by the initial direction of shift of the inertia means, in one direction or the opposite direction, following initiation of an application of the brakes for causing the fluid pressure release valve device to be operated under the control of the inertie operated means only upon retardation of the car wheel and for causing the supply valve device to be operated under the control of the inertia operated means only upon acceleration of the car wheel.

24. In a fluid pressure brake system for a car or train, in combination, a brake cylinder, means manually operative to control the supply of fluid under pressure to and the release of fluid under pressure from the brake cylinder to effect, respectively, the application and the release of the brakes, a rotary member rotatable according to the direction and speed of rotation of a car wheel, a rotary inertia element, resilient means adapted to hold said inertia element in a certain normal position relative to the rotary member, whereby said inertia element rotates with the said rotary member, and effective to yieldingly resist movement of the inertia element relative to the rotary member in opposite directions from the normal position upon the acceleration and deceleration, respectively, of the rotary member, a valve device operative to release fluid under pressure from the brake cylinder, a valve device operative to cause fluid under pressure to be supplied to the brake cylinder, and means conditioned according to the initial direction of movement of the inertia element relative to the rotary member in one direction or the opposite direction, following the initiation of an application of the brakes for causing said release valve device to be operated under the control of the inertia element only upon the retardation of the car wheel and for causing the supply valve device to be operated under the control of the inertia element only upon acceleration of the car wheel.

25. In a fluid pressure brake system for a car or train, in combination, a brake cylinder, means operative manually to control the supply of fluid under pressure to and the release of fluid under pressure from the brake cylinder to effect, respectively, the application and the release of the brakes, a rotatable member driven in accordance with the direction and speed of rotation of a car wheel, a rotary inertia element, resilient means arranged to hold the inertia element for rotation with the rotatable member and effective to yieldingly resist movement of the inertia element relative to the rotatable member in opposite directions from a normal position upon acceleration and retardation of the rotatable member, a cut-off valve device operative to cut off the supply of fluid under pressure to the brake system when the car wheel is retarded at a rate in excess of a certain rate, a release valve device operative to release fluid under pressure from the brake cylinder when the car wheel is retarded at a rate in excess of a certain rate faster than the first certain rate, an application valve device operative to open a communication through which fluid under pressure is supplied to the brake cylinder when the car wheel is accelerated at a rate in excess of a certain rate, and means effective to cause operation of the cut-off valve device, the release valve device and the application valve device in the order named for opposite directions of travel of the car and correspondingly opposite directions of rotation of the car wheel.

26. A control device comprising a rotary driven member, a rotary inertia element, resilient means arranged to hold the driven member and the inertia element for rotation together and effective to yieldingly resist movement of the inertia element relative to the driven member in opposite directions from a normal position upon acceleration or retardation of the driven member, a brush device carried on the inertia element, a plurality of insulated contact segments carried on the driven member, one of said segments being constantly engaged by said brush device and the other segments being so constructed and disposed that the brush device selectively connects said one segment to one or more of the said other segments in succession as the degree of relative movement between the inertia element and the driven member increases, and means for effecting a separate continuous electrical connection to each of the said contact segments.

27. A control device comprising a rotary driven member, a rotary inertia element, resilent means arranged to hold the driven member and the inertia element for rotation together and effective to yieldingly resist movement of the inertia element relative to the driven member in opposite directions from a normal position upon acceleration or retardation of the driven members, a brush device carried on the inertia element, a plurality of insulated contact segments carried on the driven member, one of said segments being constantly engaged by said brush device, others of said segments being disposed to one side of said brush device in the normal position thereof and adapted to be engaged by the brush device in succession as the inertia element moves relative to the driven member in one direction from the normal position thereof, and still others of said segments being disposed on the opposite side of said brush device in the normal position thereof and adapted to be engaged by the brush device in succession as the inertia element moves relative to the driven member in the opposite direction from the normal position thereof, and means for effecting a separate continuous electrical connection to each of said segments.

28. A control valve mechanism comprising a casing having a supply passage and a discharge passage, a cut-off valve device normally permitting the supply of fluid under pressure from the supply passage to the discharge passage and operative to cut off the supply of fluid under pressure from the supply passage to the discharge passage, a normally closed release valve device operative to release fluid under pressure from the discharge passage, and a normally closed application valve device operative to open a communication through which fluid under pressure may be supplied from the said supply passage to the discharge passage in by-pass relation to the said cut-off valve device.

29. A control valve mechanism comprising a casing having a supply passage and a discharge passage, a cut-off valve device normally permitting the supply of fluid under pressure from the supply passage to the discharge passage and operative to cut off the supply of fluid under pressure from the supply passage to the discharge passage, a normally closed release valve device operative to release fluid under pressure from the discharge passage, a normally closed application valve device operative to open a communication through which fluid under pressure may be supplied from the said supply passage to the discharge passage in by-pass relation to the said cut-off valve device, a communication connecting the supply passage to the discharge passage in by-pass relation to the said cut-off valve device, and a one-way valve in said last communication for preventing the supply of fluid under pressure from the supply passage to the discharge passage and adapted to permit flow of fluid under pressure of the discharge passage through the said communication to the supply passage at any time.

30. A control valve mechanism comprising a casing having a supply passage and a discharge passage, a cut-off valve device normally permitting the supply of fluid under pressure from the supply passage to the discharge passage and operative to cut off the supply of fluid under pressure from the supply passage to the discharge passage, a normally closed release valve device operative to release fluid under pressure from the discharge passage, a normally closed application valve device operative to open a communication through which fluid under pressure may be supplied from the said supply passage to the discharge passage in by-pass relation to the said cut-off valve device, and a fluid pressure differential control switch device subject in opposing relation to the pressure in the discharge passage and the pressure in the supply passage.

31. A control valve mechanism comprising a casing having a supply passage and a discharge passage, a cut-off valve device normally permitting fluid under pressure to be supplied from the supply passage to the discharge passage and operative to cut off the supply of fluid under pressure from the supply passage to the discharge passage, a normally closed release valve device operative to vent fluid under pressure from the discharge passage at a certain rate, a second normally closed release valve device operative to vent fluid under pressure from the discharge passage at a second certain rate faster than the first said certain rate, and a normally closed application valve device operative to open a communication for the supply of fluid under pressure from the supply passage to the discharge passage in by-pass relation to the cut-off valve device.

32. In a fluid pressure brake system for a car or train, in combination, a brake cylinder, valve means operative to control the supply of fluid under pressure to and the release of fluid under pressure from the brake cylinder to effect, respectively, the application and the release of the brakes, associated with all of the car wheels, a pipe normally charged with fluid under pressure and extending throughout the car or train, inertia operated means actuated according to the rate of retardation of a car wheel, means controlled by said inertia operated means and operative to cut off the supply of fluid under pressure to the brake cylinder as effected under the control of the said valve means when the said car wheel is retarded at a certain rate, means controlled by said inertia operated means and operative when the car wheel is retarded at a second certain rate higher than the first said certain rate for effecting a reduction of pressure in said pipe, and means responsive to the reduction in the pressure in said pipe for effecting a reduction of the pressure in the brake cylinder.

33. In a fluid pressure brake system for a car or train, in combination, a brake cylinder, valve means operative to control the supply of fluid under pressure to and the release of fluid under pressure from the brake cylinder to effect, respectively the application and the release of the brakes associated with all the car wheels, a pipe normally charged with fluid under pressure, inertia operated means actuated according to the rate of retardation of a car wheel, means controlled by the said inertia operated means and operative to cut off the supply of fluid under pressure to the brake cylinder, as effected under the control of the said valve means, when the said car wheel is retarded at a certain rate, means controlled by the inertia operated means and operative as long as the car wheel is retarded at a second certain rate higher than the first said certain rate for effecting and maintaining a predetermined reduction in the normal pressure carried in the said pipe, and means operated in response to the reduction of the pressure in said pipe and effective as long as the predetermined amount of reduction from the normal pressure is maintained for causing fluid under pressure to be released from the brake cylinder.

34. In a fluid pressure brake system for a car or train, in combination, a brake cylinder, valve means operative to control the supply of fluid under pressure to and the release of fluid under pressure from the brake cylinder to effect, respectively, the application and the release of the brakes associated with a car wheel, a pipe normally charged with fluid under pressure, a reservoir charged with fluid under pressure from said pipe, a volume chamber normally at atmospheric pressure, fluid pressure responsive means subject on one side to the pressure in the said reservoir and on the opposite side to the opposing force of a spring and the pressure in the said volume chamber, a valve normally in closed position and operated by the fluid pressure responsive means to vent fluid under pressure from the volume chamber when the pressure in the volume chamber slightly exceeds a certain pressure which is a certain amount less than the pressure in the said pipe in order to maintain the said certain amount of reduction, a magnet valve device normally effective to connect the volume chamber to atmosphere and operative when energized to cause fluid under pressure to be vented from the said normally charged pipe to the volume chamber to effect a reduction of pressure in said pipe, inertia operated means actuated according to the rate of retardation of a car wheel, means controlled by the said inertia operated means and operative to cut off the supply of fluid under pressure to the brake cylinder, as effected under the control of the said valve means, when the said car wheel is retarded at a certain rate, said magnet valve device being energized under the control of the inertia operated means as long as the car wheel is retarded at a second certain rate higher than the first said certain rate, and means operated in response to the reduction of the pressure in said pipe and effective as long as the reduction is maintained, for causing fluid under pressure to be released from the brake cylinder.

35. In a fluid pressue brake system for a car or train, in combination, a brake cylinder, valve means operative to control the supply of fluid under pressure to and the release of fluid under pressure from the brake cylinder to effect, respectively, the application and the release of the brakes associated with a car wheel, a pipe normally charged with fluid under pressure and extending throughout the train, a reservoir charged with fluid under pressure from the said pipe, a one-way valve for preventing flow of fluid under pressure from the said reservoir to the said pipe, a volume chamber, a magnet valve device normally connecting the volume chamber to atmosphere and operative when energized to vent fluid under pressure from the said pipe to the said volume chamber to effect reduction of pressure in said pipe, differential fluid pressure responsive means subject in opposing relation to the pressure in the said reservoir and the pressure built up in the said volume chamber and operative to prevent increase in the pressure in the volume chamber beyond a certain pressure which is a certain predetermined amount below that normally carried in the said pipe, inertia operated means actuated according to the rate of retardation of the said car wheels, means controlled by the said inertia operated means and operative to cut off the supply of fluid under pressure to the brake cylinder as effected under the control of the said valve means when the said car wheel is retarded at a certain rate, said magnet valve device being energized under the control of the inertia operated means as long as the car wheel is retarded at a second certain rate higher than the first said certain rate to cause reduction of the pressure in said pipe, and means operated in response to the said predetermined amount of reduction in the pressure in said pipe for causing fluid under pressure to be released from the brake cylinder.

36. In a fluid pressure system for a car or train, in combination, a brake cylinder, valve means operative to control the supply of fluid under pressure to and the release of fluid under pressure from the brake cylinder to effect, respectively, the application and the release of the brakes associated with a car wheel, a pipe normally charged with fluid under pressure and extending the length of the train, a reservoir charged with fluid under pressure from the said pipe, a one-way valve for preventing flow of fluid under pressure from the said reservoir to the said pipe, a pneumatic switch device operative upon the supply of fluid under pressure thereto to effect the release of fluid under pressure from the brake cylinder, fluid pressure differential responsive means subject in opposing relation to the pressure in said pipe and the pressure in a chamber, and operative upon the reduction of the pressure in said pipe for causing fluid under pressure to be supplied to the pneumatic switch device, an inertia operated means actuated according to the rate of retardation of the said car wheel, means controlled by the said inertia operated means and operative to cut off the supply of fluid under pressure to the brake cylinder as effected under the control of the said valve means when the said car wheel is retarded at a certain rate, and means controlled by the inertia operated means and operative when the car wheel is retarded at a second certain rate higher than the first said certain rate for effecting a reduction of pressure in said pipe, whereby said fluid pressure differential responsive means is operated to supply fluid under pressure to the pneumatic switch device to cause fluid under pressure to be released from the brake cylinder.

37. In a fluid pressure system for a car or train, in combination, a brake cylinder, valve means operative to control the supply of fluid under pressure to and the release of fluid under pressure from the brake cylinder to effect, respectively, the application and the release of the brakes associated with a car wheel, a pipe normally charged with fluid under pressure and extending the length of the train, a reservoir charged with fluid under pressure from the said pipe, a one-way valve for preventing flow of fluid under pressure from the said reservoir to the said pipe, a pneumatic switch device operative upon the supply of fluid under pressure thereto to effect the release of fluid under pressure from the brake cylinder, fluid pressure differential responsive means subject in opposing relation to the pressure in said pipe and the pressure in a chamber, and operative upon the reduction of the pressure in said pipe for causing fluid under pressure to be supplied to the pneumatic switch device, an inertia operated means actuated according to the rate of retardation of the said car wheel, means controlled by the said inertia operated means and operative to cut off the supply of fluid under pressure to the brake cylinder as effected under the control of the said valve means when the said car wheel is retarded at a certain rate, and means controlled by the inertia operated means and operative when the car wheel is retarded at a second certain rate higher than the first said certain rate for effecting a reduction of pressure in said pipe, whereby said fluid pressure differential responsive means is operated to supply fluid under pressure to the pneumatic switch device to cause fluid under pressure to be released from the brake cylinder, and means actuated when the retardation of the car wheel decreases from the said second certain rate for connecting the said reservoir to the said pipe and to one side of the fluid pressure differential responsive means for aiding in effecting recharge of the said pipe and for increasing the rapidity of the operation of the fluid pressure differential responsive means to release fluid under pressure from the pneumatic switch device.

38. In a fluid pressure brake system for a train of cars, in combination, means operative to effect application and release of the brakes on a train, a pipe extending through all the cars of the train and normally charged with fluid at a certain pressure, means responsive to the rate of rotative retardation of one car wheel occurring upon an application of the brakes and effective to cause a reduction of pressure in said pipe when the said one wheel is retarded at a rate in excess of a certain rate of retardation, and means responsive to the reduction of pressure in said pipe for reducing the braking force effecting application of the brakes on the train.

39. In a fluid pressure brake system for a train of cars, in combination, means operative to effect application and release of the brakes on a train, a pipe extending through all the cars of the train and normally charged with fluid at a certain pressure, means effective upon an application of the brakes to produce and maintain a certain amount of reduction of pressure in said pipe as long as a car wheel is retarded rotatively at a rate in excess of a certain rate of retardation, and means operative as long as said certain amount of reduction of pressure is maintained in said pipe for reducing the braking force effecting application of the brakes on the train.

40. In a fluid pressure brake system for a train of cars, in combination, means operative to effect application and release of the brakes on a train, a pipe extending through all the cars of the train and normally charged with fluid at a certain pressure, means effective upon an application of the brakes to produce and maintain a certain amount of reduction of pressure in said pipe as long as the said one wheel is retarded rotatively at a rate in excess of a certain rate of retardation, means operated as long as said certain amount of reduction of pressure in said pipe is maintained for reducing the braking force effecting application of the brakes on the train, and means for effecting restoration of pressure in said pipe toward said certain pressure when the said one wheel is thereafter retarded at a rate less than said certain rate of retardation.

41. In a fluid pressure brake system for a train of cars, in combination, means operative to establish a desired degree of braking force for effecting application of the brakes on the train, a pipe extending through all the cars of the train and normally charged with fluid at a certain pressure, means operative to effect a certain uniform amount of reduction of pressure in said pipe from said certain pressure, means responsive to said certain uniform amount of reduction of pressure in said pipe for reducing the braking force effecting application of the brakes on the train, and inertia means responsive to rotative retardation of one car wheel at a rate in excess of a certain rate for causing operation of said pressure reduction means.

42. The method of controlling vehicle wheel brakes which comprises rapidly reducing the braking force effecting application of the brakes when a wheel slips in order to cause the wheel to accelerate back toward a speed corresponding to vehicle speed, and then restoring the braking force only so long as the rate of rotative acceleration of the vehicle wheel exceeds a certain rate.

43. The method of controlling vehicle wheel brakes which comprises rapidly reducing the braking force effecting the application of the brakes on a vehicle wheel, when the vehicle wheel slips, only so long as the vehicle wheel decelerates rotatively at a rate in excess of a certain rate, and then restoring the braking force only so long as the vehicle wheel accelerates at a rate in excess of a certain rate in returning toward a speed corresponding to vehicle speed following the reduction in the braking force.

44. The method of controlling vehicle wheel brakes which comprises rapidly reducing the braking force effecting application of the brakes when a wheel slips in order to cause the wheel to accelerate back toward a speed corresponding to vehicle speed, and then restoring the braking force at a substantially uniform rate only so long as the rate of rotative acceleration of the vehicle wheel exceeds a certain rate.

45. The method of controlling vehicle wheel brakes which comprises rapidly reducing the braking force effecting the application of the brakes on a vehicle wheel, when the vehicle wheel slips, only so long as the vehicle wheel decelerates rotatively at a rate in excess of a certain rate, and then restoring the braking force at a substantially uniform rate only so long as the vehicle wheel accelerates at a rate in excess of a certain rate in returning toward a speed corresponding to vehicle speed following the reduction in the braking force.

46. In a vehicle or train brake system, in combination, means for establishing a desired braking force for effecting application of the brakes on a vehicle wheel, means operative automatically when the vehicle wheel slips due to the application of the brakes with the said desired braking force and effective to reduce the braking force an amount dependent upon the time the wheel decelerates, in slipping, at a rate in excess of a certain rate, and means operative automatically upon acceleration of the wheel back toward a speed corresponding to vehicle speed and effective to restore the braking force an amount dependent upon the time the wheel accelerates at a rate in excess of a certain rate.

47. In a vehicle or train brake system, in combination, means for establishing a desired braking force for effecting application of the brakes on a vehicle wheel, means operative automatically when a vehicle wheel slips due to the application of the brakes with the said desired braking force and effective to reduce the braking force an amount dependent upon the time the wheel decelerates, in slipping, at a rate in excess of a certain rate, and means operative automatically upon acceleration of the wheel back toward a speed corresponding to vehicle speed and effective to restore the braking force an amount dependent upon the time the wheel accelerates at a rate in excess of a certain rate, the amount which said last means restores the braking force being less than the amount of reduction effected by the reduction means.

48. In a vehicle train brake system, in combination, a brake cylinder, a communication chargeable with fluid at different pressures to initiate the application of the brakes, a valve normally effective to permit the supply of fluid under pressure from said communication to the brake cylinder to establish a pressure in the brake cylinder corresponding to the pressure in the said communication, means operative when a vehicle wheel rotatively decelerates at a rate in excess of a certain rate for effecting operation of said valve to prevent the supply of fluid under pressure therepast from the said communication to the brake cylinder, means operative when the vehicle wheel rotatively decelerates at a second certain rate higher than the first said certain rate, in slipping, for effecting a rapid reduction in the brake cylinder pressure to prevent sliding of the vehicle wheel, and means operative as the vehicle wheel returns toward a speed corresponding to vehicle speed upon relief of the wheel-slipping condition for effecting restoration of the brake cylinder pressure and effective to limit the maximum brake cylinder pressure restored to a pressure which is substantially less than the pressure established in the said communication, and means effective to cause said valve to continue to prevent the supply of fluid under pressure therepast to the brake cylinder once the said valve is operated to cut off the supply to the brake cylinder and operative upon a reduction of the pressure in the said communication to render the said valve effective to again supply fluid under pressure therepast to the brake cylinder to any desired degree in excess of the said maximum restored brake cylinder pressure.

49. In a vehicle train brake system, in combination, a brake cylinder, a communication chargeable with fluid at different pressures to initiate the application of the brakes, a valve normally effective to permit the supply of fluid under pressure from said communication to the brake cylinder to establish a pressure in the brake cylinder corresponding to the pressure in the said communication, means operative when a vehicle wheel rotatively decelerates at a rate in excess of a certain rate for effecting operation of said valve to prevent the supply of fluid under pressure therepast from the said communication to the brake cylinder, means operative when the vehicle wheel rotatively decelerates at a second certain rate higher than the first said certain rate, in slipping, for effecting a rapid reduction in the brake cylinder pressure to prevent sliding of the vehicle wheel, and means operative as the vehicle wheel returns toward a speed corresponding to vehicle speed upon relief of the wheel-slipping condition for effecting restoration of the brake cylinder pressure and effective to limit the maximum brake cylinder pressure restored to a pressure which is substantially less than the pressure established in the said communication, and means effective as long as the brake cylinder pressure is at least a certain uniform amount lower than the pressure established in the said communication for preventing operation of the said valve thereafter to permit the supply of fluid under pressure from said communication to the brake cylinder past said valve.

JOSEPH C. McCUNE.